United States Patent
Ibrahim

(10) Patent No.: US 7,961,874 B2
(45) Date of Patent: Jun. 14, 2011

(54) XZ-ELLIPTIC CURVE CRYPTOGRAPHY WITH SECRET KEY EMBEDDING

(75) Inventor: Mohammad K. Ibrahim, Leicester (GB)

(73) Assignee: King Fahd University of Petroleum & Minerals, Dhahran (SA)

(*) Notice: Subject to any disclaimer, the term of this patent is extended or adjusted under 35 U.S.C. 154(b) by 702 days.

(21) Appl. No.: 12/044,606

(22) Filed: Mar. 7, 2008

(65) Prior Publication Data

US 2008/0260143 A1    Oct. 23, 2008

Related U.S. Application Data

(63) Continuation-in-part of application No. 10/790,677, filed on Mar. 3, 2004, now Pat. No. 7,379,546.

(51) Int. Cl.
*H04K 1/00*    (2006.01)
*H04L 9/00*    (2006.01)

(52) U.S. Cl. ...................................................... 380/28

(58) Field of Classification Search .................. 380/28, 380/30, 44, 259, 263, 277, 278, 282; 713/176
See application file for complete search history.

(56) References Cited

U.S. PATENT DOCUMENTS

| | | | | |
|---|---|---|---|---|
| 6,088,453 | A * | 7/2000 | Shimbo | 380/28 |
| 6,714,648 | B2 * | 3/2004 | Miyazaki et al. | 380/30 |
| 6,876,745 | B1 * | 4/2005 | Kurumatani | 380/28 |
| 7,162,033 | B1 * | 1/2007 | Coron | 380/30 |
| 7,379,546 | B2 * | 5/2008 | Ibrahim | 380/28 |
| 7,483,533 | B2 * | 1/2009 | Ibrahim | 380/44 |
| 7,483,534 | B2 * | 1/2009 | Ibrahim | 380/44 |
| 2001/0046291 | A1 * | 11/2001 | Vanstone et al. | 380/28 |
| 2002/0065574 | A1 * | 5/2002 | Nakada | 700/121 |
| 2003/0059042 | A1 * | 3/2003 | Okeya et al. | 380/30 |
| 2003/0123656 | A1 * | 7/2003 | Izu et al. | 380/30 |
| 2004/0114756 | A1 * | 6/2004 | Moller et al. | 380/30 |
| 2004/0228478 | A1 * | 11/2004 | Joye | 380/28 |
| 2004/0247114 | A1 * | 12/2004 | Joye | 380/28 |
| 2007/0053506 | A1 * | 3/2007 | Takashima | 380/28 |
| 2007/0177721 | A1 * | 8/2007 | Itoh et al. | 380/28 |

* cited by examiner

*Primary Examiner* — Beemnet W Dada
(74) *Attorney, Agent, or Firm* — Lowe Hauptman Ham & Berner, LLP

(57) ABSTRACT

Secure communications over an insecure channel is provided using symmetric key elliptic curve cryptography. More specifically, a shared secret key and/or data bit string is embedded in the X-coordinate and the Z-coordinate of an elliptic curve point defined in projective coordinates, wherein the embedding process is deterministic and non-iterative. In addition, the base point may be blinded by making the base point dependant on the shared secret key.

27 Claims, 3 Drawing Sheets

XZ-ELLIPTIC CURVE CRYPTOGRAPHY WITH SECRET KEY EMBEDDING

CROSS REFERENCE

This application is a continuation-in-part of U.S. application Ser. No. 10/790,677 file Mar. 3, 2004 now U.S. Pat. No. 7,379,546, titled "Method for XZ-Elliptic Curve Cryptography," which is incorporated herein by reference in its entirety for all purposes.

TECHNICAL FIELD

The following description relates generally to cryptography and more particularly to a method for encrypting and decrypting a message bit string using a group of points on an elliptic curve over a finite field.

BACKGROUND

Cryptography provides privacy and authentication for remote communications and data storage. Privacy may be provided by encrypting data using symmetric cryptography. Symmetric cryptography uses a single mathematical key to encrypt and decrypt data. However, symmetric cryptography, whose algorithms use the same key to encrypt and decrypt a message require the sharing of a secret for authentication. Authentication may be provided using the functions of user identification, data integrity, and message non-repudiation.

Asymmetric or public-key cryptography enables encrypted communication between users who have not previously established a shared secret key. Public-key cryptography is based on key pairs. A key pair consists of a private key and a public key. The private key is only known by its owner, while the public key is typically associated with its owner in an authenticated manner and shared with others. The public key is used to encrypt the message, and the private key is used to decrypt the message. As a result, the encrypted message may be sent using an insecure channel with the assurance that only the intended recipient can decrypt it. Public key encryption may be interactive (e.g., encrypting a telephone conversation) or non-interactive (e.g., encrypting electronic mail). Identification protocols may be used to provide user identification. For example, digital signature may be used to provide data integrity, message non-repudiation, and user identification. A public key is used to encrypt or verify a signature of a message, and a private key is used to decrypt or generate a signature of a message.

U.S. Pat. No. 4,200,770, entitled "CRYPTOGRAPHIC APPARATUS AND METHOD," describes the use of cryptographic key pairs and their application to the problem of key agreement over an insecure communication channel. The algorithms specified in U.S. Pat. No. 4,200,770 relies on the difficulty of the mathematical problem of finding a discrete logarithm for their security. U.S. Pat. No. 4,200,770 is hereby incorporated herein by reference in its entirety for all purposes.

Security of a discrete-logarithm based crypto algorithm may be undermined by performing the inverse of modular exponentiation (i.e., a discrete logarithm). Although mathematical methods for finding a discrete logarithm exist (e.g., the Number Field Sieve), these methods are hard to complete in a reasonable time period if certain conditions are met in the specification of the crypto algorithm, for example, if sufficiently large numbers are used. Large numbers require more time and computing power to find the discrete logarithm and break the cryptograph. However, large numbers result in long public keys and slow transmissions of cryptographic data. In addition, the use of very large numbers also requires longer processing times and greater computational power to perform the crypto algorithm. As a result, cryptographers continue to search for ways to minimize the size of the numbers used and the computational power required to perform the encryption and/or authentication algorithms.

A discrete-logarithm based crypto algorithm can be performed in any mathematical set in which certain algebraic rules hold true. In mathematical language, the set is a finite cyclic group. The discrete logarithm problem may be more difficult to solve in one group than in another for numbers of comparable size. As a result, the choice of the group is critical to the cryptographic system.

Typically, the more difficult the discrete logarithm problem is, the smaller the numbers that are used to implement the crypto algorithm. Of course, working with small numbers is easier and faster than working with large numbers. Using small numbers also results in a better performing, faster cryptographic system that requires less storage. Therefore, by carefully choosing the right group, a user may be able to work with smaller numbers, make a faster cryptographic system, and get the same, or better, cryptographic strength than a cryptographic system using larger numbers.

The state of elliptic curve cryptography is described in a paper by Neal Koblitz, Alfred Meneges and Scott Vanstone, Design, Codes and Cryptography 19 173-193 (2000) which is incorporated herein in its entirety by reference for all purposes. More recent developments are described in the U.S. Pat. No. 6,424,712 to of Vanstone et al. and the published U.S. Patent Applications Nos. 2003/0059042 to Okeya et al., 2003/0123656 to Izu et al., and 2003/0142820 to Futa et al., all of which are incorporated herein by reference in there entirety for all purposes. Earlier U.S. Pat. No. 4,200,770 to Hellman et al. discloses an earlier cryptographic apparatus and method. These disclosures all address the issue of speeding up elliptic curve scale multiplications.

SUMMARY

In one general aspect, secure communications over an insecure channel is provided using symmetric key elliptic curve cryptography. More specifically, a shared secret key is embedded in the X-coordinate and the Z-coordinate of an elliptic curve point defined in projective coordinates, wherein the embedding process is deterministic and non-iterative.

The embedding applies projective coordinates in two stages. In the first stage, a projective coordinate is used to embed extra message data bits in the Z coordinate. In the second stage a projective coordinate is used to remove a division operation at each iteration of the process and to randomize the computation thereby providing a counter measure against differential power analysis. The shared secret key is partly or wholly embedded in the X-coordinate and/or the Z-coordinate of an elliptic curve point represented in projective coordinates in a deterministic and non-iterative manner to reduce the overhead or time needed by conventional iterative embedding methods used in existing elliptic curve cryptography in which the number of iterations needed is different for different bit strings that are being embedded.

According to this process the elliptic curve and its twist are isomorphic to each other. The isomorphic relationship between an elliptic curve and its twist, which is obtained as a result of the selected projective coordinate, ensures that any bit string whose equivalent binary value is an element of the underlying finite field has a bijective relationship between the bit string and a point which is either on an elliptic curve or its twist.

In one general aspect, encrypting or encoding and decrypting or decoding a message bit string in an information processing system includes establishing an elliptic curve message point $(X_m, Y_m, Z_m)$ by embedding a message bit string into the elliptic curve message point. The shared secret key (k) is embedded into the X-coordinate and the Z-coordinate of another elliptic curve point $(X_k, Y_k, Z_k)$. A cipher point $(X_c, Y_c, Z_c)$ is then computed using, $(X_c, Y_c, Z_c) = (X_m, Y_m, Z_m) + (X_k, Y_k, Z_k)$. Appropriate bits of the X-coordinate, $X_c$ and the Z-coordinate $Z_c$ of the cipher point $(X_c, Y_c, Z_c)$ are then sent to a receiving device and the shared secret key (k) is used to find $(X_k, Y_k, Z_k)$. The message point $(X_m, Y_m, Z_m)$ is computed using $(X_m, Y_m, Z_m) = (X_c, Y_c, Z_c) - (X_k, Y_k, Z_k)$, and the message bit string is recovered from $X_m$ and $Z_m$.

Because a key is generated using an initial shared secret key and a random generator, the above elliptic curve encryption may be used as a stream/block cipher to encrypt a stream of data blocks based on a one-time pad principle such as that used in classical stream/block ciphers without the use of costly scalar multiplication for each message data block. As a result, a significant reduction in computational complexity is achieved. In addition, because elliptic curve computations are known to be more difficult to break than computations based on conventional field arithmetic, the processes described herein have an advantage over the classical stream ciphers.

In yet another general aspect, part of the initial shared secret, $k_0$, is embedded into the X-coordinate and the Z-coordinate of an elliptic curve point $(X_{k0}, Y_{k0}, Z_{k0})$. The other part of the shared secret key, $k_1$, is used as a scalar and multiplied with the point $(X_{k0}, Y_{k0}, Z_{k0})$ to obtain the scalar multiplication $k_1(X_{k0}, Y_{k0}, Z_{k0})$. The initial secret key also may be used in conjunction with a random number generator to generate a sequence of different secret keys that are used to encrypt different message data blocks in a similar fashion to a one time pad encryption. The secret key for the jth message data block, k(j), is embedded into an elliptic curve point to find the point, $(X_{k(j)}, Y_{k(j)}, Z_{k(j)})$. The message bit stream may be divided into blocks, and an elliptic curve message point $(X_{m(j)}, Y_{m(j)}, Z_{m(j)})$ may be generated for the jth block by embedding the bit string of the jth message data block into the elliptic curve message point. The cipher point of the jth message data block is then computed using $(X_{c(j)}, Y_{c(j)}, Z_{c(j)}) = (X_{m(j)}, Y_{m(j)}, Z_{m(j)}) + (X_{k(j)}, Y_{k(j)}, Z_{k(j)}) + S_{(j)}k_1(X_{k0}, Y_{k0}, Z_{k0})$, where $S_{(j)}$ when j=0 and is zero otherwise.

In another general aspect, appropriate bits of the X-coordinate, $X_c$, and the Z-coordinate, $Z_c$, of the cipher point, $(X_c, Y_c, Z_c)$, are sent to a receiving device. Part of the initial shared secret, $k_0$, is embedded into the X-coordinate and the Z-coordinate of an elliptic curve point $(X_{k0}, Y_{k0}, Z_{k0})$ at the receiving device. The other part of the shared secret key, $k_1$, is used as a scalar and multiplied with the point $(X_{k0}, Y_{k0}, Z_{k0})$ to obtain the scalar multiplication $k_1(X_{k0}, Y_{k0}, Z_{k0})$. The initial secret key also may be used in conjunction with a random number generator to generate a sequence of different secret keys in an identical manner as that carried out by the sending device. The secret key for the jth message data block, k(j), is embedded into an elliptic curve point to find the point, $(X_{k(j)}, Y_{k(j)}, Z_{k(j)})$. The message point, $(X_m, Y_m, Z_m)$, may be computed using, $(X_{m(j)}, Y_{m(j)}, Z_{m(j)}) = (X_{c(j)}, Y_{c(j)}, Z_{c(j)}) - (X_{k(j)}, Y_{k(j)}, Z_{k(j)}) - S_{(j)}k_1(X_{k0}, Y_{k0}, Z_{k0})$, and the bit string of the jth message block may be recovered from $X_{m(j)}$ and $Z_{m(j)}$.

In the classical approach of elliptic curve cryptography, the security of the resulting cryptosystem relies on the difficulty breaking the elliptic curve discrete logarithm problem, which can be summarized as: given the points $k(X_B, Y_B, Z_B)$ and $(X_B, Y_B, Z_B)$ find the scalar k. According to a process described herein, the base point is blinded as it is dependant on the secret key making the elliptic curve discrete logarithm problem more difficult to solve since the attacker only has the point $k_1(X_{k0}, Y_{k0}, Z_{k0})$ from which to find the two parts of the secret key, $k_0$ and $k_1$. The increased difficulty of solving the problem of the blinded base point may be used to increase security for the same elliptic curve group order and/or to reduce complexity for the same security by using a group with a smaller order.

Other features will be apparent from the description, the drawings, and the claims.

DESCRIPTION OF DRAWINGS

Like reference symbols in the various drawings indicate like elements.

DETAILED DESCRIPTION

Figure 1:
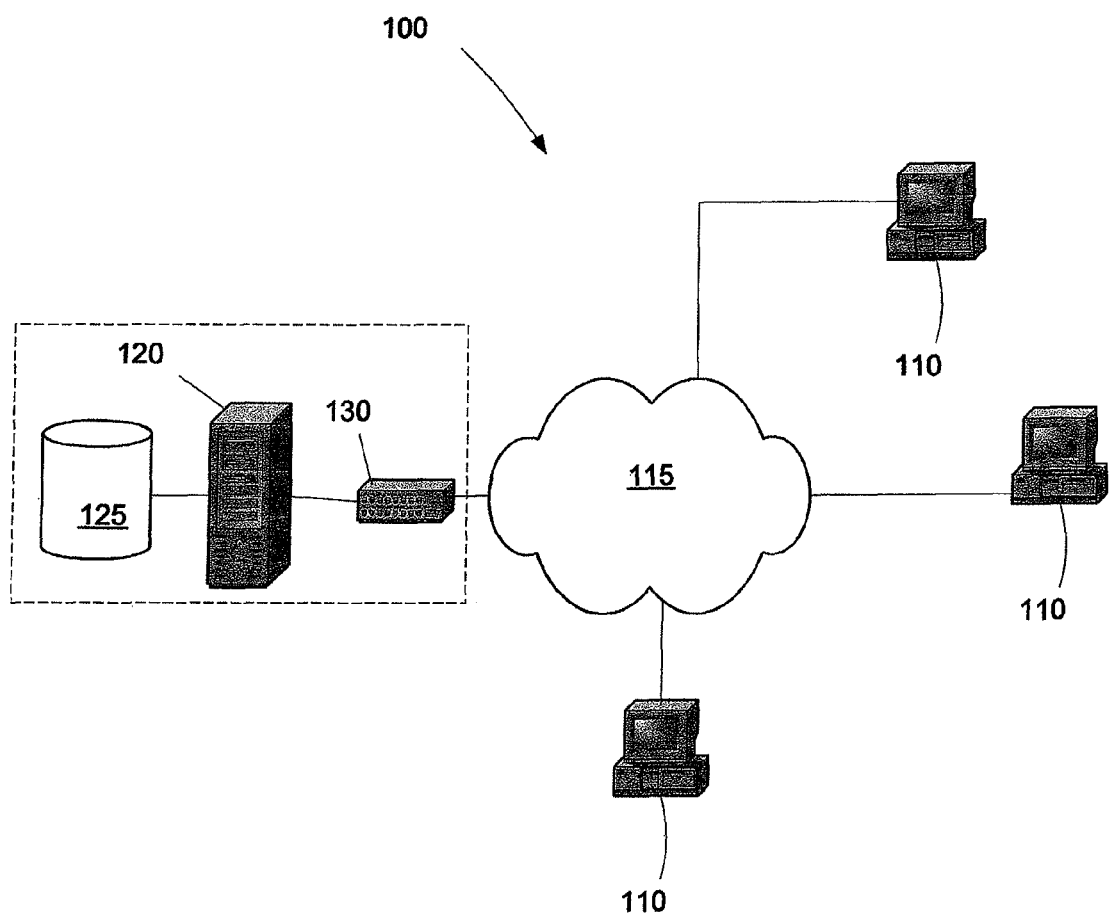
FIG. 1 shows an exemplary communications system.

Overview
Elliptic Curves & Cryptography

The groups referred to above derive from the set of finite fields. Elliptic curve cryptography is an improvement over finite-field based public-key cryptography. Methods for adapting discrete-logarithm based algorithms to the set of elliptic curves are known; however, finding discrete logarithms for elliptic curves is particularly difficult. As a result, elliptic curve-based crypto algorithms may be implemented using much smaller numbers than in the set of finite-fields of comparable cryptographic strength.

An elliptic curve group over Fields F(p), denoted as E(p), may be formed by choosing a pair of a and b coefficients, which are elements within F(p). The group consists of a finite set of points P(x,y) which satisfy the elliptic curve equation:

$$F(x,y) = y^2 - x^3 - ax - b = 0 \qquad 1.1$$

together with a point at infinity, O. The coordinates of the point x and y, are elements of F(p) represented in N-bit strings. A point is either written as a capital letter, for example, P, or as a pair in terms of the affine coordinates, that is (x,y).

An elliptic curve cryptosystem relies upon the difficulty of the elliptic curve discrete logarithm problem (ECDLP) to provide an effective cryptosystem. Using multiplicative notation, the problem can be described as: given points B and Q in the group, find a number k such that $B^k = Q$; where k is called the discrete logarithm of Q to the base B. Using additive notation, the problem becomes: given two points B and Q in the group, find a number k such that kB=Q.

In an elliptic curve cryptosystem, the large integer k is kept private and is often referred to as the secret key. The point Q together with the base point B are made public and are referred to as the public key. The security of the system relies upon the difficulty of deriving the secret k, knowing the public points B and Q. The primary factor that determines the security strength of such a system is the size of its underlying finite field. In a real cryptographic application, the underlying field is made so large that it is computationally infeasible to determine k by computing all multiples of B until Q is found.

At the core of the elliptic curve geometric arithmetic is an operation called scalar multiplication that computes kB by adding together k copies of the point B. Scalar multiplication may be performed through a combination of point-doubling and point-addition operations. The point-addition operation adds two distinct points together; the point-doubling operation adds two copies of a point together. For example, computing 11 B=(2*(2*(2B)))+3B=Q would take three point-doublings and one point-addition.

Addition of two points on an elliptic curve may be calculated as follows. A straight line drawn through two points intersects an elliptic curve at a third point. The point symmetric to the third point with respect to the x-axis is defined as a point resulting from the addition.

Doubling a point on an elliptic curve may be calculated as follows. A tangent line drawn at a point on an elliptic curve intersects the elliptic curve at another point. The point symmetric to the intersecting point with respect to the x-axis is defined as a point resulting from the doubling.

Table 1 illustrates the addition rules for adding two points $(x_1,y_1)$ and $(x_2,y_2)$, that is, $$(x_3,y_3)=(x_1,y_1)+(x_2,y_2) \qquad 1.2$$

TABLE 1

Summary of Addition Rules: $(x_3, y_3) = (x_1, y_1) + (x_2, y_2)$

| | |
|---|---|
| General Equations | $x_3 = m^2 - x_2 - x_1$ |
| | $y_3 = m(x_3 - x_1) + y_1$ |
| Point Addition | $m = \dfrac{y_2 - y_1}{x_2 - x_1}$ |
| Point Doubling $(x_3, y_3) = 2(x_1, y_1)$ | $m = \dfrac{3x_1^2 - a}{2y_1}$ |
| $(x_2, y_2) = -(x_1, y_1)$ | $(x_3, y_3) = (x_1, y_1) + (-(x_1, y_1)) = O$ |
| $(x_2, y_2) = O$ | $(x_3, y_3) = (x_1, y_1) + O = (x_1, y_1)$ |
| $-(x_1, y_1)$ | $=(x_1, -y_1)$ |

Overview of Elliptic Curve Encryption and Decryption

Given a message point $(x_m,y_m)$, a base point $(x_B,y_B)$ and a given key, k, the cipher point $(x_C,y_C)$ is obtained using the following equation:

$$(x_C,y_C)=(x_m,y_m)+k(x_B,y_B) \qquad 1.3$$

There are two basics steps in the computation of the above equations. The first step is to find the scalar multiplication of the base point with the key, "$k(x_B,y_B)$". The second adds the resulting point to the message point $(x_m,y_m)$ to obtain the cipher point. Conversely, the message point is recovered at the receiver from the cipher point which is usually transmitted with, the shared key and the base point, that is:

$$(x_m,y_m)=(x_C,y_C)-k(x_B,y_B) \qquad 1.4$$

Embedding Message Data on Elliptic Curve Points

As indicated earlier, the x-coordinate, $x_m$, is represented as an N-bit string. Not all of the N-bits are used to carry information about the data of the secret message. Assume that the number of bits of the x-coordinate, $x_m$, that do not carry data is L. The extra bits, L, are used to ensure that message data embedded into the x-coordinate provides an $x_m$ value that satisfies the elliptic curve equation, as first proposed in "N. Koblitz, Introduction to Elliptic Curve and Modular Forms, New York: Springer-Verlag 1993".

It has been reported that the number of iterations needed to find such a value vary from two to thirteen iterations. It also has been reported that if a first guess of $x_m$ is not on a curve, then a second or third try usually is, although this does not guarantee that a solution will be found in two to three iterations. Therefore, the number of bits used to carry the message data is (N−L). Assuming that the secret data is an M-bit string, the number of elliptic curve points needed to encrypt the K-bit data is $$\left\lceil \frac{K}{N-L} \right\rceil.$$

It is important to note that the y-coordinate, $y_m$, of the message point carries no data bits.

Attacks

The difficulty in solving the elliptic curve discrete logarithm problem has been established theoretically. However, there is a possibility that information associated with secret information, such as, for example, the private key, may be determined during cryptographic processing of real applications. For example, an attack method using power analysis has been proposed that decrypts the secret information based on the information derived from the cryptographic processing.

One example of an attack method is differential power analysis (DPA) that measures changes in voltage in cryptographic processing of secret information to obtain the cryptographic process and infer the secret information on the basis of the obtained process. A DPA is disclosed in P. Kocher, J. Jaffe and B. Jun Differential Power Analysis, Advances in Cryptology: Proceedings of CRYPTO '99, LNCS 1666, Springer-Verlag, (1999) pp. 388-397.

An elliptic curve cryptosystem to which the above-mentioned attack method is applied is disclosed by J. Coron, in Resistance against Differential Power Analysis for Elliptic Curve Cryptosystems, Cryptographic Hardware and Embedded Systems: Proceedings of CHES '99, LNCS 1717, Springer-Verlag, (1999) pp. 292-302. In the elliptic curve cryptosystem, encryption, decryption, signature generation, and signature verification of a given message are carried out with elliptic curve operations. In particular, calculation of scalar multiplication on an elliptic curve is used in cryptographic processing using a scalar value as the secret information.

A method using randomized projective coordinates is one of the countermeasures to DPA attack on elliptic curve cryptosystems. This method protects against observing whether or not a specific value appears in a scalar multiplication calculation and inferring a scalar value from the observed result. In other words, the inferring a specific value is prevented by multiplication with a random value.

Conventional elliptic curve cryptosystems have not accounted for attack by power analysis, such as DPA. As a result, additional calculations have to be carried out during the cryptographic processing of secret information to prevent attack by power analysis. This may be accomplished by weakening any correlation between the cryptographic process and the secret information. However, the additional time required for cryptographic processing significantly lowers the efficiency of a computer with slow calculation speeds, such as an IC card, or a server managing an enormous number of cryptographic processes. In addition, the correlation between the cryptographic processing and the secret information cannot be entirely eliminated. On the other hand, if priority is given to the cryptographic processing efficiency, the cryptosystem may be susceptible to power analysis attack and the possibility that secret information is discovered

Speed of Computations

With the development of communication networks, cryptographic techniques for concealing or authenticating electronic information have been indispensable. However, increased processing speeding is demanded in addition to the security of various cryptographic techniques. Because of the complexity of the elliptic curve discrete logarithm problem, elliptic curve cryptosystems may use a relatively shorter key length than conventional RSA (Rivest-Shamir-Adleman) cryptosystems which base their level of security on the difficulty of factorization into prime factors. As a result, elliptic curve cryptosystems have promise to open the way to comparatively high-speed cryptographic processing. However, the increased processing speed of elliptic curve cryptosystems is not always great enough to satisfy the limitations of certain smart cards that have restricted throughput or servers that perform large volumes of cryptographic processing. Therefore, additional processing speed in cryptosystems is needed.

The two equations to determine "m" in Table 1 are called slope equations. Computation of a slope equation using integer fields requires one modular integer division. Alternatively, the slope computation may be computed using one modular integer inversion and one modular integer multiplication. Modular integer division and modular integer inversion are computationally intensive because they require extensive CPU cycles to manipulate two large integers modular a large prime number. It is commonly accepted that a point-doubling and a point-addition operation each require one inversion, two multiplication, a square, and several addition calculations. To date there are techniques to compute modular integer division and modular integer inversion, and techniques to trade computationally intensive inversions for multiplications by performing the operations in projective coordinates.

In cases where field inversions are significantly more computationally intensive than multiplication, it is more efficient to implement projective coordinates. For example, an elliptic curve projective point $(X,Y,Z)$ in conventional projective (or homogeneous) coordinates satisfies the homogeneous Weierstrass equation:

$$\tilde{F}(X,Y,Z) = Y^2 Z - X^3 - aXZ^2 - bZ^3 = 0 \qquad 1.5$$

and, when $Z \neq 0$, the elliptic curve projective point corresponds to the affine point $$(x, y) = \left(\frac{X}{Z}, \frac{Y}{Z}\right).$$

Other projective representations may provide even more efficient implementations of the group operation (e.g., as indicated by D. V. Chudnovsky and G. V. Chudnovsky, Sequences of numbers generated by addition in formal groups and new primality and factorization tests, Adv. In Appli. Math. Vol. 7, 1987, pp 385-434) or, for example, the Jacobian representations where the triplets $(X,Y,Z)$ correspond to the affine coordinates $$(x, y) = \left(\frac{X}{Z^2}, \frac{Y}{Z^3}\right)$$

whenever $Z \neq 0$. This is equivalent to using Jacobian elliptic curve equation that is of the form:

$$\tilde{F}_J(X,Y,Z) = Y^2 - X^3 - aXZ^4 - bZ^6 = 0 \qquad 1.6$$

Another commonly used projection is the Chudnovsky-Jacobian coordinates.

In general terms, the relationship between the affine coordinates and the projection coordinates may be expressed $$(x, y) = \left(\frac{X}{Z^i}, \frac{Y}{Z^j}\right)$$

where the values of i and j depend on the choice of the projective coordinates, for example, for homogeneous coordinates, $i=1$ and $j=1$.

It is important to note that the group addition rules are defined in the affine coordinates and not in any of the projective coordinates, that is:

$$\left(\frac{X_3}{Z_3^i}, \frac{Y_3}{Z_3^j}\right) = \left(\frac{X_1}{Z_1^i}, \frac{Y_1}{Z_1^j}\right) + \left(\frac{X_2}{Z_2^i}, \frac{Y_2}{Z_2^j}\right) \qquad 1.7$$

In other words, the computation of the coordinate values of $X_3, Y_3$ and $Z_3$ are based on the equations in Table 1, whereby the value of $Z_3$ is chosen from the denominator of the equations in Table 1 in order to remove the division operations from the calculations of $X_3$ and $Y_3$.

This implies that $$\left(\frac{X_1}{Z_1^i}, \frac{Y_1}{Z_1^j}\right), \left(\frac{X_2}{Z_2^i}, \frac{Y_2}{Z_2^j}\right) \text{ and } \left(\frac{X_3}{Z_3^i}, \frac{Y_3}{Z_3^j}\right)$$

lie on the same straight line, while $(X_1,Y_1,Z_1)$, $(X_2,Y_2,Z_2)$ and $(X_3,-Y_3,Z_3)$ do not lie on the same line.

This implies that one cannot write:

$$(X_3,Y_3,Z_3) = (X_1,Y_1,Z_1) + (X_2,Y_2,Z_2)$$

when the addition, +, is defined over the affine coordinate.

It should be noted that defining the elliptic curve points as a group over addition is necessary so that equation 1.7 can be re-written as:

$$\left(\frac{X_2}{Z_2^i}, \frac{Y_2}{Z_2^j}\right) = \left(\frac{X_3}{Z_3^i}, \frac{Y_3}{Z_3^j}\right) - \left(\frac{X_1}{Z_1^i}, \frac{Y_1}{Z_1^j}\right)$$

It is this group definition, which leads to the fact that decryption, which is described in equation 1.4, is in fact the reciprocal of encryption as defined in equation 1.3.

The use of projective coordinates circumvents the need for division in the computation of each point addition and point doubling during the calculation of scalar multiplication. Therefore, integer modular division may be avoided in the calculation of scalar multiplication, $$k \left(\frac{X_B}{Z_B^i}, \frac{Y_B}{Z_B^j}\right)$$

when using projective coordinate.

The last addition for the computation of the cipher point, $$\left(\frac{X_C}{Z_C^i}, \frac{Y_C}{Z_C^j}\right),$$

i.e., the addition of the two points $$\left(\frac{X_m}{Z_m^i}, \frac{Y_m}{Z_m^j}\right)$$

and $$k\left(\frac{X_B}{Z_B^i}, \frac{Y_B}{Z_B^j}\right)$$

also may be carried out in the chosen projection coordinate, that is:

$$\left(\frac{X_C}{Z_C^i}, \frac{Y_C}{Z_C^j}\right) = \left(\frac{X_m}{Z_m^i}, \frac{Y_{m1}}{Z_m^j}\right) + \left(\frac{X_B}{Z_B^i}, \frac{Y_B}{Z_B^j}\right)$$

It should be pointed out that $Z_m=1$.

However, one division (or one inversion and one multiplication) is needed to calculate $$x_C = \frac{X_C}{Z_C^i},$$

since only the affine x-coordinate of the cipher point, $x_C$, is transmitted by the sender.

Therefore, the encryption of (N–L) bits of the secret message using elliptic curve encryption requires at least one division when using projective coordinates. Similarly, the decryption of a single message encrypted using elliptic curve cryptography also requires at least one division when using projective coordinates.

Exemplary Communications System

As shown by the exemplary architecture illustrated FIG. 1, a communications system 100 may include a host device 101 connected to client devices 110 using a communications channel or path 115 to provide network online services, content, and resources to the one or more client devices 110 and their users.

The client devices 110 may be operated by one or more users to access the host device or other client devices 110. An example of a client device 110 is a general-purpose computer capable of responding to and executing instructions in a defined manner. Client devices 110 also may include a special-purpose computer, a processor, a microprocessor, a microcomputer, a personal computer ("PC"), a workstation, a mainframe, a server, a laptop, a mobile communications device/phone, a personal digital assistant ("PDA"), an interactive television set, a set top box, an on-board (i.e., vehicle-mounted) computer, or a combination of two or more of these devices capable of responding to, generating, and/or executing instructions. The client device 110 may include any number of other devices, components, and/or peripherals, such as additional computing devices, memory/storage devices, input devices, output devices, user interfaces, and/or communications interfaces.

The client device 110 also may include one or more software applications including, for example, encryption/decryption software loaded on the client device 110 to command and direct the client device 110. Software applications may be implemented as a computer program, a piece of code, an instruction, or some combination thereof, for independently or collectively instructing the client device 110 to interact and operate as desired.

The applications may be embodied permanently or temporarily in any type of machine, component, physical or virtual equipment, storage medium, or propagated signal wave capable of providing instructions to the client device 110. In particular, the applications may be stored on a storage medium or device including volatile and non-volatile (e.g., a read only memory (ROM), a random access memory (RAM), a flash memory, a floppy disk, a hard disk, a tape, a DROM, a flip-flop, a register, an SRAM, DRAM, PROM, EPROM, OPTROM, EEPROM, NOVRAM, or RAMBUS), such that if the storage medium or device is read by the client device 110, the specified steps, processes, and/or instructions are performed.

The client device 110 may also include one or more communications interfaces that allow the client device 110 to send and receive information using the communications paths 115. The communications paths 115 may be configured to send and receive signals (e.g., electrical, electromagnetic, or optical) that convey or carry data streams representing various types of analog and/or digital data. For example, the communications paths 115 may be implemented using various communications media and one or more networks comprising one or more network devices (e.g., servers, routers, switches, hubs, repeaters, and storage devices). The one or more networks may include a local area networks (LAN), a wide area network (WAN), a plain old telephone service (POTS) network, a digital subscriber line (DSL) network, an integrated services digital network (ISDN), a synchronous optical network (SONNET), or a combination of two or more of these networks. In addition, the communications paths 115 may include one or more wireless links (e.g., cellular, mobile, GSM, CDMA, TDMA, and satellite) that transmit and receive electromagnetic signals, such as, for example, radio, infrared, and microwave signals, to convey information. Because the communications paths 115 may cover any number of networks and media, generally, they are considered unsecured.

The host device 101 includes a host processing device 120, and storage device 125, and a communications interface 130 that allows the host processing device 120 to exchange data with the client devices 110 using the communications paths 115. The communications interface 130 may be implemented as part of the host processing device 120 or separately. The communications interface 130 may exchange data with the host processing device 120. In addition, the interface 130 may include one or more interfaces, including interfaces for different types of hardware and for different types of communications media and protocols to translate information into a format that may be used by the host processing device 120. Similarly, the interface 130 may translate data/information received from the processing device 120 to a format that may be transmitted to the client devices 110 via a communications path 115.

The host processing device 120 may be implemented using a general-purpose or special purpose computer or processor capable of responding to and executing instructions in a defined manner. The host processing device 120 also may include some combination of one or more processing devices capable of responding to, generating, and/or executing instructions. The host processing device 120 may include any number of other devices, components, and/or peripherals, such as additional computing devices, memory/storage devices, input devices, output devices, user interfaces, and/or communications interfaces. In one implementation, the host processing device 120 may be implemented using one or more servers. The host processing device 120 may communicate with the secure data storage 125.

The host processing device 120 may run one or more software applications to command and direct the host processing device 120. The software applications may include a computer program, a piece of code, an instruction, or some combination thereof, for independently or collectively instructing the host processing device 120 to operate as desired. In particular, the host processing device 120 may include a software application that is run by the host processing device 120, such as, for example, am elliptic curve cryptography application that is explained in greater detail below.

The storage device 125 may be implemented using any type of memory including volatile and nonvolatile, for example, as described above. The secure data storage 125 may store any type of data. The storage device 125 may be implemented as an integral part of the host processing device 120, as a separate storage device, and/or as a remote storage device. The storage device 125 may include one or multiple storage devices including one or more storage devices at a remote location.

It will be appreciated by those of skill in the art, that the host device 101 (e.g., a server) may be implemented by a client device 110.

Because users are often located remotely or outside of a secure system, and use communications paths 115 that are not secure, data encryption/decryption may be used to establish secure communications and provide privacy and user authentication. The system and methods described herein provide secure communications between entities over unsecured communications channels using symmetric key elliptic curve cryptography. More specifically, the process uses the X-coordinate and the Z-coordinate of an elliptic curve when represented in projective coordinates, wherein point addition is defined over a three dimensional space that includes the projective coordinate to provide shared secret key embedding using a deterministic and non-iterative embedding approach, as described in greater detail below.

Definition of a Set of Elliptic Curve Points Represented in Projective Coordinate as a Group Over Addition:

It is well known that the symbol $\epsilon$ denote set membership. Given a field $F(p)$, and a & $b \in F(p)$, $EC^2$ may be defined as the set of points $(x,y)$ that satisfy the elliptic curve equation in affine coordinate, that is equation 1.1, where x & $y \in F(p)$ together with a point at infinity.

It is shown in the above mentioned book by N. Koblitz, that using the addition rules defined above for the set of points $EC^2$, the set $EC^2$ forms an abelian group over addition, $(EC^2, +)$.

A new projection $(X,Y,Z)$ is defined here as Ibrahim's projection, which is related to the affine coordinate as follows, $$y = \frac{Y}{Z^{\frac{3}{2}}}$$
$$x = \frac{X}{Z}$$
3.1

Substituting Ibrahim's projection in equation 1.1, Ibrahim's form of the elliptic curve equation is obtained:

$$\tilde{F}(X, Y, Z) = Z^3 F\left(\frac{X}{Z}, \frac{Y}{Z^{\frac{3}{2}}}\right) = Y^2 - X^3 - aXZ^2 - bZ^3 = 0$$
3.2

Note that if $F(x,y)$ is non-singular, i.e., $4a^2+27b^3 \neq 0$, then $\tilde{F}(X,Y,Z)$ also is non-singular. The following assumes non-singular elliptic curve equations.

The set of points $EC^3$ is defined as the triplets $(X,Y,Z)$, where X,Y & $Z \in F(p)$, that satisfy Ibrahim's form of the elliptic curve equation plus a point at infinity $(X_I, Y_I, Z_I)$ and excluding the point at the origin, $(0,0,0)$. Note that $EC^3$ is expressed in projective coordinates while $EC^2$ is expressed in affine coordinates.

The addition rules for the group $(EC^2, +)$ can be adopted to define an additive binary operation, +, over $EC^3$, that is for all $(X_1,Y_1,Z_1) \in EC^3$ and $(X_2,Y_2,Z_2) \in EC^3$, the sum:

$$(X_3,Y_3,Z_3)=(X_1,Y_1,Z_1)+(X_2,Y_2,Z_2)$$
3.3 is also $(X_3,Y_3,Z_3) \in EC^3$.

It is shown that $(EC^3, +)$ also forms a group over addition that satisfies the following axioms:

(i) There exists $(X_I,Y_I,Z_I) \in EC^3$ such that $(X,Y,Z)+(X_I,Y_I,Z_I)=(X,Y,Z)$ for all $(X,Y,Z) \in EC(K^3)$;

(ii) For every $(X,Y,Z) \in EC^3$ there exists $-(X,Y,Z) \in EC^3$ such that $(X,Y,Z)-(X,Y,Z)=(X_I,Y_I,Z_I)$;

(iii) the additive binary operation is commutative; and.

(iv) the additive binary operation is associative.

Definition of the Addition Rules for the Group $(EC^3, +)$

Addition of two points on an elliptic curve in projective coordinates, $EC^3$, may be calculated as follows. When a straight line is drawn through the two points of $EC^3$, the straight line intersects the elliptic curve at a projective coordinate at a third point. The point symmetric to this third intersecting point with respect to the X-axis is defined as a point resulting from the addition.

A straight-line equation in projective coordinates may be expressed as:

$$\frac{X - X_1}{X_2 - X_1} = \frac{Y - Y_1}{Y_2 - Y_1} = \frac{Z - Z_1}{Z_2 - Z_1}$$
3.4

A basic rule may be formulated as follows: draw the line that joins the two points to be added in the set $EC^3$. Denoting the third point of intersection as $(X_3',Y_3',Z_3')$, the sum point is defined as $(X_3,Y_3,Z_3)=(X_3',-Y_3',Z_3')$.

It follows from the above definition that the addition over $EC^3$ is commutative, i.e., $(X_1,Y_1,Z_1)+(X_2,Y_2,Z_2)=(X_2,Y_2,Z_2)+(X_1,Y_1,Z_1)$ for all $(X_1,Y_1,Z_1) \in E(K^3), (X_2,Y_2,Z_2) \in E(K^3)$. This satisfies the third axiom (iii) given above.

There are four main cases A, B, C, and D that are considered for the computation of addition for $(EC^3, +)$ which may be expressed as:

$X_1 \neq X_2$  A.

$X_1 = X_2 \& Z_1 \neq Z_2$  B.

$(X_1,Y_1,Z_1)=(X_2,Y_2,Z_2)$ (point doubling)  C.

$X_1 = X_2 \& Z_1 = Z_2$  D.

Case A:

In Case A where $X_1 \neq X_2$, one can write, $$Y_3' = Y_1 + m_y(X_3' - X_1) \qquad 3.5$$

and $$Z_3' = Z_1 + m_z(X_3' - X_1) \qquad 3.6$$

where $$m_y = \frac{Y_2 - Y_1}{X_2 - X_1} \qquad 3.7$$

and $$m_z = \frac{Z_2 - Z_1}{X_2 - X_1} \qquad 3.8$$

Substituting equation 3.5 for $Y_3'$ and equation 3.6 for $Z_3'$ in Ibrahim's form of the elliptic curve equation (i.e., equation 3.2) the follow expression is obtained:

$$(Y_1 + m_y(X - X_1))^2 - X^3 - aX(Z_1 + m_z(X - X_1))^2 - b(Z_1 + m_z(X - X_1))^3 = 0 \qquad 3.9$$

Expanding the terms between brackets and grouping the terms with the same powers of X, the following is obtained:

$$X^3 + am_z^2 X^3 + bm_z^2 X^3 - m_y^2 X^2 + 2am_z Z_1 X^2 - 2am_z^2 X^2 X_1 + \\ bm_z^2 Z_1 X^2 + 2bm_z^2 Z_1 X^2 - 2bm_z^3 X^2 X_1 - bm_z^3 X^2 X_1 - \\ 2m_y Y_1 X + 2m_y^2 X X_1 + aXZ_1^2 - 2am_z Z_1 XX_1 + \\ am_z^2 XX_1^2 + 2bm_z Z_1^2 X - 2XX_1 bm_z^2 Z_1 + bm_z XZ_1^2 - \\ 4bm_z^2 Z_1 XX_1 + bm_z^3 XX_1^2 + 2bm_z^3 XX_1^2 - Y_1^2 + \\ 2m_y Y_1 X_1 - m_y^2 X_1^2 + bZ_1^3 - 2bm_z Z_1^2 X_1 + bX_1^2 m_z^2 Z_1 - \\ bm_z X_1 Z_1^2 + 2bm_z^2 Z_1 X_1^2 - bm_z^3 X_1^3 = 0 \qquad 3.10$$

It is understood that any cubic equation has three roots:

$$(X - X_1)(X - X_2)(X - X_3') = 0. \qquad 3.11$$

Scaling the coefficient of the term $X^3$ to 1 in equation 3.10, and equating the coefficient of the term $X^2$ in equations 3.10 and 3.11, the following is obtained:

$$X_3' = \frac{1}{c}(m_y^2 - 2am_z Z_1 + 2am_z^2 X_1 - 3bm_z^2 Z_1 + 3bm_z^3 X_1) - X_1 - X_2 \qquad 3.12$$

or $$X_3' = \frac{1}{c}(m_y^2 - (2a + 3bm_z)m_z Z_1 + (2a + 3bm_z)m_z^2 X_1) - X_1 - X_2 \qquad 3.13$$

and after grouping terms to reduce the number of computations, the following is obtained:

$$X_3' = \frac{1}{c}(m_y^2 - m_z(2a + 3bm_z)(Z_1 - m_z X_1)) - X_1 - X_2 \qquad 3.14$$

where, $$c = 1 + am_z^2 + bm_z^3 \qquad 3.15$$

Substituting for the solution of $X_3'$, which is given in equation 3.14, in equation 3.5, the solution for $Y_3'$ is obtained. Similarly, substituting for the solution of $X_3'$, which is given in equation 3.14, in equation 3.6, the solution for $Z_3'$ is obtained.

Case B:

In Case B $X_1 = X_2$ and $Z_1 \neq Z_2$. Letting $X_o = X_1 = X_2$, $X_3 = X_1 = X_2 = X_o$, because the straight line is in the YZ-plane $X_o$.

Therefore:

$$Y_3' = Y_1 + n_y(Z_3' - Z_1) \qquad 3.16$$

where $$n_y = \frac{Y_2 - Y_1}{Z_2 - Z_1}$$

Substituting equation 3.16 for $Y_3'$ in Ibrahim's form of the elliptic curve equation, (i.e., equation 3.2), and noting that $X = X_o$, the following equation is obtained $$(Y_1 + n_y(Z - Z_1))^2 - X_o^3 - aX_o Z^2 - bZ^3 = 0 \qquad 3.17$$

Expanding the terms between brackets and grouping the terms with the same powers of Z, the following equation is obtained:

$$Z^3 - \frac{1}{b}(n_y^2 Z^2 - aX_o Z^2) + \\ \frac{1}{b}(2n_y Y_1 Z - 2n_y^2 ZZ_1 + Y_1^2 - 2n_y Y_1 Z_1 + n_y^2 Z_1^2 - X_o^3) = 0 \qquad 3.18$$

As previously noted, any cubic equation has three roots:

$$(Z - Z_1)(Z - Z_2)(Z - Z_3') = 0 \qquad 3.19$$

Equating the coefficient of the term $Z^2$ in equations 3.18 and 3.19, the following equation is obtained:

$$Z_3' = \frac{1}{b}(n_y^2 - aX_o) - Z_1 - Z_2 \qquad 3.20$$

Substituting for the solution of $Z_3'$, which is given in equation 3.20, in equation 3.16 the solution for $Y_3'$ is obtained.

Case C:

In case C, or the point doubling case, $(X_1, Y_1, Z_1) = (X_2, Y_2, Z_2)$. Let $(X_o, Y_o, Z_o) = (X_1, Y_1, Z_1) = (X_2, Y_2, Z_2)$, that is, $(X_3, Y_3, Z_3) = 2(X_o, Y_o, Z_o)$ Doubling a point on an elliptic curve in projective coordinates may be defined in several ways. For example:

C.1 When a tangent line in the XY-plane is drawn at a point on an elliptic curve, the tangent line intersects the elliptic curve in the projective coordinate, $EC^3$, at another point. The point symmetric to this intersecting point with respect to the X-axis is defined as a point resulting from the doubling. Note that in this case $Z_3' = Z_o$.

C.2 When a tangent line in the YZ-plane is drawn at a point on an elliptic curve, the tangent line intersects the elliptic curve in the projective coordinate, $EC^3$, at another point. The point symmetric to this intersecting point with respect to the X-axis is defined as a point resulting from the doubling. Note that in this case $X_3' = X_o$.

C.3 Some form of a combination of rules/gradients in C.1 and C.2 above. The simplest is to perform doubling using rule C.1 followed by another doubling using rule C.2. Another is to use the gradients in C.1 and C.2 simultaneously.

The following considers case C.1 and case C.2 only.
Case C.1: In this case, $Z_3=Z_1=Z_2=Z_o$. The gradient of the tangent of the point $(X_o,Y_o,Z_o)$ of the elliptic curve in projective coordinates in a XY-plane is given by, $$\frac{dY}{dX} = \frac{3X_o^2 + aZ_o^2}{2Y_o} = m_y \qquad 3.21$$

Substituting equation 3.21 for $m_y$ in equation 3.14, and noting that $m_z=0$ in this case, a solution for $X_3'$ is obtained:

$$X_3'=m_y^2-X_1-X_2 \qquad 3.22$$

Substituting for the solution of $X_3'$, which is given in equation 3.22, in equation 3.5 the solution for $Y_3'$ is obtained.
Case C.2: In this case, $X_3=X_1=X_2=X_o$. The gradient of the tangent of the point $(X_o,Y_o,Z_o)$ of the elliptic curve in projective coordinates in a YZ-plane is given by, $$\frac{dY}{dZ} = \frac{2aX_oZ_o + 3bZ_o^2}{2Y_o} = n_y \qquad 3.23$$

Substituting equation 3.23 for $n_y$ in equation 3.20 a solution for $Z_3'$ is obtained:

$$Z_3' = \frac{1}{b}(n_y^2 - aX_o) - Z_1 - Z_2 \qquad 3.24$$

Substituting for the solution of $Z_3'$, which is given in equation 3.24, in equation 3.16 the solution for $Y_3'$ is obtained.
Case D
In case D, $X_1=X_2$ and $Z_1=Z_2$. Let $X_o=X_1=X_2$ and $Z_o=Z_1=Z_2$. If these values are directly substituted in the Ibrahim form of the elliptic curve equation, (i.e., equation 3.2), a quadratic equation for the Y-coordinate is obtained:

$$Y^2=X_o^3+aX_oZ_o^2+bZ_o^3 \qquad 3.25$$

Denoting $Y_o$ as one of the solutions, the other solution is $-Y_o$. Therefore, a line perpendicular to the XZ-plane intersects $EC^3$ at only two points $(X,Y,Z)$ and $(X,-Y,Z) \in EC^3$, and shows the symmetry of $EC^3$ about the X-axis and the Z-axis. Furthermore, every $(X,Y,Z) \in EC^3$ has a unique mirror image point $(X,-Y,Z) \in EC^3$. Now, since a line joining such pairs $(X,Y,Z)$ and $(X,-Y,Z) \in EC^3$ does not intersect with $EC^3$ at a third finite point, such lines are assumed to intersect with $EC^3$ at the point of infinity $(X_1,Y_1,Z_1)$. This point at infinity is used to define both the inverse of a point in $EC^3$ and the identity point. According to the addition rule defined in section 3.1, one can write:

$$(X,Y,Z)+(X,-Y,Z)=(X_1,Y_1,Z_1) \qquad 3.26$$

since the third point of intersection of such lines is the point at infinity. This equation therefore defines a unique inverse for any point: $(X,Y,Z) \in EC^3$, $$-(X,Y,Z)=(X,-Y,Z) \qquad 3.27$$

Therefore equation 3.26 can be written as:

$$(X,Y,Z)-(X,Y,Z)=(X_1,Y_1,Z_1) \qquad 3.28$$

A line joining the point at infinity and any point $(X,Y,Z) \in EC^3$ will intersect with $EC^3$ at $(X,-Y,Z)$. Therefore from the addition rule defined in section 3.1, one can also write, $$(X,Y,Z)+(X_1,Y_1,Z_1)=(X,Y,Z) \qquad 3.29$$

Equation 3.28 satisfies the second axiom (ii) while equation 3.29 satisfies first axiom (i) of the Group $(EC^3,+)$.
Associativity of $EC^3$:
One way of proving associativity of $(EC^3,+)$ is as follows. Given particular elliptic curves (i.e., for particular coefficient's "a & b" and finite filed $F(p)$), if it can be shown by computation that any point $Q \in EC^3$ can be uniquely written as $k_Q P$, where P is the generator point of the group $(EC^3,+)$, $EC^3$groups based on such curves are associative. The reason is that any three points $Q,R,S \in EC^3$ can be written as $k_Q P, k_R P, k_S P \in EC^3$, respectively, and hence their sum $(Q+R+S)=(k_Q P+k_R P+k_S P)=(k_Q+k_R+k_S)P$ can be carried out in any order.
Second Projective Coordinate
Each of the equations for point addition and point doublings derived for the cases A, B, and C above require one modular inversion or division. In cases where field inversions or divisions are significantly more expensive than multiplication, a second projective coordinate may be used to remove the requirement for field inversion or division from these equations. As shown below, the numbers of operations needed for $EC^3$ point doubling and point additions when performed in the second projective coordinate are comparable to those needed in $EC^2$.
Several projective coordinates can be used.
A homogenous projection may be used as an example:

$$X = \frac{X}{V} \qquad 4.1.a$$

$$Y = \frac{Y}{V} \qquad 4.1.b$$

$$Z = \frac{Z}{V} \qquad 4.1.c$$

Using this projection in the Ibrahim's form of the elliptic curve equation, (i.e., equation 3.2), one obtains the Homogenous-Ibrahim elliptic curve equation:

$$\tilde{F}(X,Y,Z,V) = V \tilde{F}\left(\frac{X}{V}, \frac{Y}{V}, \frac{Z}{V}\right) \qquad 4.2$$
$$= Y^2V - X^3 - aXZ^2 - bZ^3$$
$$= 0$$

An elliptic curve projective point $(X, Y, Z, V)$ using Homogenous-Ibrahim projective coordinates satisfies the Homogenous-Ibrahim elliptic curve equation, equation 4.2. When $V \neq 0$, the Homogenous projected point $(X, Y, Z, V)$ corresponds to the Ibrahim-projected point, $$(X, Y, Z) = \left(\frac{X}{V}, \frac{Y}{V}, \frac{Z}{V}\right).$$

Using homogenous projective coordinates, equation 3.3 may be expressed as:

$$\left(\frac{X_3}{V_3}, \frac{Y_3}{V_3}, \frac{Z_3}{V_3}\right) = \left(\frac{X_1}{V_1}, \frac{Y_1}{V_1}, \frac{Z_1}{V_1}\right) + \left(\frac{X_2}{V_2}, \frac{Y_2}{V_2}, \frac{Z_2}{V_2}\right) \qquad 4.3$$

The following description shows how the homogenous projective coordinates can be used to remove the need for modular inversion or division from the equations for each of the above mentioned cases A, B, and C.

Case A:

Substituting for X, Y, and Z in terms of the projective coordinates in equations 4.1.a-c, in equation 3.12, and noting that $c=1+am_z^2+bm_z^3$, one obtains:

$$\frac{X_3'}{V_3} = \frac{(\lambda_{yv}^2\lambda_{xy} - 2a\lambda_{zy}\lambda_{xv}^2 Z_1 + 2a\lambda_{zy}^2\lambda_{xv}X_1 - 3b\lambda_{zv}^2\lambda_{xv}Z_1 + 3b\lambda_{zv}^3 X_1)}{\lambda_{xzv}} - \frac{X_1'}{V_1} - \frac{X_2'}{V_2} \quad 4.4$$

where $$\lambda_{xv}=(X_2V_1-X_1V_2) \quad 4.5$$

$$\lambda_{yv}=(Y_2V_1-V_1Y_2) \quad 4.6$$

$$\lambda_{zv}=(Z_2V_1-Z_1V_2) \quad 4.7$$

$$\lambda_{xzv}=(\lambda_{xv}^3+a\lambda_{xv}\lambda_{zv}^2 b\lambda_{zv}^3) \quad 4.8$$

Let $V_3=V_1V_2\lambda_{xv}\lambda_{xzv}$ 4.9

Substituting equation 4.9 for $V_3$ in equation 4.4, the following expression is obtained:

$$X_3'=\lambda_{xv}A_{x3} \quad 4.10$$

where $$A_{x3}=\{\lambda_{yv}^2\lambda_{xv}V_2-\lambda_{zv}(2a\lambda_{xv}+3b\lambda_{zv})(\lambda_{xv}Z_1V_2-\lambda_{zv}X_1V_2)-\lambda_{xzv}(V_2X_1+V_1X_2)\} \quad 4.11$$

Substituting for X and Y in terms of the projective coordinates in equations 4.1.a & b, in equation 3.5, and after some simplification, the following expression is obtained:

$$\frac{Y_3'}{V_3} = \frac{Y_1}{V_1} + \frac{(Y_2V_1-Y_1V_2)}{(X_2V_1-X_1V_2)V_3}\left(X_3' - \frac{X_1V_3}{V_1}\right) \quad 4.12$$

Substituting equations 4.9 and 4.10 for $V_3$ and $X_3'$ in equation 4.12 results in:

$$Y_3'=V_2\lambda_{xv}\lambda_{xzv}Y_1+\lambda_{yv}(A_{x3}-V_2\lambda_{xzv}X_1) \quad 4.13$$

Substituting for X and Z in terms of the projective coordinates in equations 4.1.a & c, in equation 3.6, and after some simplification, the following equation is obtained:

$$\frac{Z_3'}{V_3} = \frac{Z_1}{V_1} + \frac{(Z_2V_1-Z_1V_2)}{(X_2V_1-X_1V_2)V_3}\left(X_3' - \frac{X_1V_3}{V_1}\right) \quad 4.14$$

Substituting equations 4.9 and 4.10 for $V_3$ and $X_3'$ in equation 4.14, the following is obtained:

$$Z_3'=V_2\lambda_{xv}\lambda_{xzv}Z_1+\lambda_{zv}(A_{x3}-V_2\lambda_{xzv}X_1) \quad 4.15$$

The number of field operations needed in equations 4.10, 4.13 & 4.15 is twenty four multiplications, three squarings, and ten additions. When using mixed coordinates, the number of multiplications may be reduced to twenty multiplications.

Case B:

Substituting for X, Y, and Z in terms of the heterogeneous projective coordinate, that is equations 4.1a-c, in equation 3.20, and noting $X_3=X_1=X_2=X_o$, one obtains, $$\frac{Z_3'}{V_3} = \frac{1}{b}\frac{(Y_2V_1-Y_1V_2)^2}{V_1V_2(Z_2V_1-Z_1V_2)^2} - \frac{a}{b}\frac{X_1}{V_1} - \frac{Z_1}{V_1} - \frac{Z_2}{V_2} \quad 4.16$$

Let $V_3 = V_1^2V_2^2(Z_2V_1-Z_1V_2)^3$ 4.17

Substituting equation 4.17 for $V_3$ in equation 4.16, one obtains, $$Z_3' = \frac{1}{b}V_1V_2(Z_2V_1-Z_1V_2)A_{3x} \quad 4.18$$

where $$A_{3x} = \left\{(Y_2V_1-Y_1V_2)^2 - (Z_2V_1^2-Z_1V_2^2)^2\left(\frac{a}{b}X_1V_2+Z_1V_2+Z_2V_1\right)\right\} \quad 4.19$$

Substituting for Y and Z in terms of the projective coordinates in equations 4.1.b and c, in equation 3.16, one obtains:

$$\frac{Y_3'}{V_3} = \frac{Y_1}{V_1} + \frac{(Y_2V_1-Y_1V_2)}{V_3}\left(\frac{Z_3'}{V_1V_2(Z_2V_1-Z_1V_2)} - \frac{Z_1V_3}{V_1V_2(Z_2V_1-Z_1V_2)V_1}\right) \quad 4.20$$

Substituting equations 4.17 and 4.18 for $V_3$ and $Z_3'$ in equation 4.20, one obtains:

$$Y_3' = V_1V_2^2(Z_2V_1-Z_1V_2)^3Y_1 + (Y_2V_1-Y_1V_2)\left(\frac{1}{b}A_{3x} - Z_1V_2(Z_2V_1-Z_1V_2)^2\right) \quad 4.21$$

The number of field operations needed in equations 4.18 & 4.21 are sixteen multiplications, two squarings, and seven additions.

Case C:

Case C.1:

Substituting for X, Y, and Z in terms of the projective coordinate in equations 4.1.a-c, in equation 3.22, the following equation is obtained:

$$\frac{X_3'}{V_3} = \frac{(3X_o^2+aZ_o^2)}{4V_o^2Y_o^2} - 2\frac{X_o}{V_o} \quad 4.22$$

Let $V_3 = 8V_o^3Y_o^3$ 4.23

Substituting equation 4.23 for $V_3$ in equation 4.22, the following equation is obtained:

$$X_3'=2V_oY_oD_{3x} \quad 4.24$$

where $$D_{3x}=\{(3X_o^2+aZ_o^2)^2-8V_oY_o^2X_o\} \quad 4.25$$

Substituting for X, Y, and Z in terms of the projective coordinate in equations in equations 4.1a-c, in equation 3.5 and using the gradient in equation 3.21, the following equation is obtained:

$$\frac{Y_3'}{V_3} = \frac{Y_o}{V_o} + \frac{3X_o^2 + aZ_o^2}{V_3}\left(\frac{2V_oY_oD_{3x}}{2V_oY_o} - \frac{X_oV_3}{2V_oY_oV_o}\right) \quad 4.26$$

Substituting equation 4.23, 4.24 and 4.25 for $V_3$, $X_3'$ and $D_{3x}$ in equation 4.26, the following equation is obtained:

$$Y_3' = 8V_o^2Y_o^4 + 3X_o^2 + aZ_o^2((3X_o^2 + aZ_o^2)^2 - 12V_oY_o^2X_o) \quad 4.27$$

The number of field operations needed in equations 4.24 & 4.27 are six multiplications, four squarings, and five additions.

Case C.2:

Substituting for X, Y, and Z in terms of the projective coordinate in equations 4.1a-c, in equation 3.24, the following equation is obtained:

$$\frac{Z_3'}{V_3} = \frac{1}{b}\frac{(2aX_oZ_o + 3bZ_o^2)^2}{4Y_o^2V_o^2} - \frac{a}{b}\frac{X_o}{V_o} - 2\frac{Z_o}{V_o} \quad 4.28$$

Let $V_3 = 8V_o^3Y_o^3$ \quad 4.29

Substituting equation 4.29 for $V_3$ in equation 4.28, the following equation is obtained:

$$Z_3' = 2V_oY_oD_{3z} \quad 4.30$$

where $$D_{3z} = \left\{\frac{1}{b}(2aX_oZ_o + 3bZ_o^2)^2 - 4\frac{a}{b}V_oY_o^2X_o - 16V_oY_o^2Z_o\right\} \quad 4.31$$

Substituting for X, Y, and Z in terms of the projective coordinate in equations 4.1a-c, in equation 3.16 and using the gradient in equation 3.23, the following equation is obtained:

$$\frac{Y_3'}{V_3} = \frac{Y_0}{V_o} + \frac{2aX_oZ_o + 3bZ_o^2}{2V_oY_0}\left(\frac{Z_3'}{V_3} - \frac{Z_o}{V_o}\right) \quad 4.32$$

Substituting equations 4.29 and 4.30 for $V_3$ and $Z_3'$ in equation 4.32, the following equation is obtained:

$$Y_3' = 8V_o^2Y_o^3Y_o + (2aX_oZ_o + 3bZ_o^2)(D_{3z} - 4V_oY_o^2Z_o) \quad 4.33$$

The number of field operations needed in equations 4.30 and 4.33 are ten multiplications, three squarings, and five additions.

$EC^3$ Elliptic Curve Cryptography:

Shared Secret Key Embedding Using Deterministic and Non-iterative Embedding Method The method for shared key cryptography described herein is to embed some or all of the bits of the shared secret key into one or more elliptic points using a new deterministic and non-iterative embedding process. One advantage of this process is that EC encryption may be made more secure by blinding the base point which is made dependant on the shared secret key.

As described above, conventional embedding of a bit string into an elliptic curve point involves an iterative algorithm to search for an x-coordinate value that leads to a quadratic residue value of the y-coordinate starting from an initial x-coordinate value specified by the bit string to be embedded. However, this process uses a different number of iterations for different bit strings that are embedded.

The following process embeds a bit-string into an appropriate elliptic curve point in a projective coordinate in a deterministic and non-iterative manner. As a result, the need for an iterative algorithm that uses a search for a quadratic residue value of the y-coordinate that requires several iterations is circumvented. In addition, the need for different number of iterations needed for different bit strings that are embedded is eliminated.

According to one implementation, the twist of an elliptic curve equation is defined as follows. Given a particular elliptic curve equation in a projective coordinate defined over a finite filed F(p), viz., $$Y^2 = X^3 + aXZ^2 + bZ^3 \quad 5.1$$

and given certain values for the X-coordinate and Z-coordinate, $X_o$ and $Z_o$, respectively, that are elements of the finite field, F(p), by substituting these values in the elliptic curve equation in projective coordinates, the quadratic equation in Y is expressed as:

$$Y^2 = X_o^3 + aX_oZ_o^2 + bZ_o^3 = T \quad 5.2$$

If the solutions of the above quadratic equation, i.e., $Y^2 = T$, are elements of the finite field F(p), the point $(X_o, Y, Z_o)$ is said to satisfy the given elliptic curve equation. If solutions of the above quadratic equation are not elements of the finite field F(p), the point $(X_o, Y, Z_o)$ is said to satisfy the twist of the given elliptic curve equation.

The following process is based on an isomorphic relationship between a curve and its twist. An elliptic curve equation in projective coordinates is isomorphic to its twist if:

1. there are mathematical mappings that can be defined on the values of X and Z, i.e., $\phi_X(X)$, $\phi_Y(Y)$, and $\phi_Z(Z)$ such that any point (X,Y,Z) that satisfies such an elliptic curve equation in projective coordinates can be mapped to another point $(\phi_X(X), \phi_Y(Y), \phi_Z(Z))$ that satisfies the twist of the same elliptic curve equation in projective coordinates i.e., the mapping is onto; and
2. the mapping between the points (X,Y,Z) and $(\phi_X(X), \phi_Y(Y), \phi_Z(Z))$ is unique, i.e., one-to-one.

This can be shown as follows. Let the right hand side of equation 5.1 be denoted as T, resulting in:

$$T = X^3 + aXZ^2 + bZ^3 \quad 5.3$$

where X, Z, T, a & b∈F(p). Any value of X and Z will result in a value of T∈F(p). T can be either quadratic residue or non-quadratic residue. If T is quadratic residue, equation 5.3 is written as follows:

$$T_q = X_q^3 + aX_qZ_q^2 + bZ_q^3 \quad 5.4$$

where $X_q$ & $Z_q$∈F(p) denote the values of X and Z that result in a quadratic residue value of T, which is denoted as $T_q$. If T is non-quadratic residue, equation 5.3 is written as follows:

$$T_{\bar{q}} = X_{\bar{q}}^3 + aX_{\bar{q}}Z_{\bar{q}}^2 + bZ_{\bar{q}}^3 \quad 5.5$$

where $X_{\bar{q}}$ & $Z_{\bar{q}}$∈F(p) denote the values of X and Z that result in a non-quadratic residue value of T, which is denoted as $T_{\bar{q}}$. Let g be any non-quadratic residue number in F(p), i.e., g∈F(p) & $\sqrt{g} \notin F(p)$. Multiplying equation 5.4 with $g^3$ results in the following equation $g^3T_q = g^3X_q^3 + a\, g^3X_qZ_q^2 + b\, g^3Z_q^3$ which can be re-written as:

$$g^3T_q = (gX_q)^3 + a(gX_q)(gZ_q)^2 + b(gZ_q)^3 \quad 5.6$$

Note that if g is non quadratic residue, $g^3$ is also non-quadratic residue. Also, it is well known that the result of multiplying a quadratic residue number by a non-quadratic residue number is non-quadratic residue number. Hence, $g^3T_q$ is non quadratic residue. By comparing the terms of equations 5.5 and 5.6, one can obtain the following mappings, $$X_{\bar{q}} = gX_q \qquad 5.7$$

$$Z_{\bar{q}} = gZ_q; \text{ and} \qquad 5.8$$

$$T_{\bar{q}} = g^3 T_q \qquad 5.9$$

The mappings between the variables:
(i) $X_q$ and $X_{\bar{q}}$ in equation 5.7;
(ii) $Z_q$ and $Z_{\bar{q}}$ in equation 5.8; and
(iii) $T_q$ and $T_{\bar{q}}$ in equation 5.9, are all bijective, i.e., onto and one-to-one from basic finite field arithmetic. As a consequence, the mappings between the three tuple $(X_q,T_q,Z_q)$ and the three tuple $(X_{\bar{q}},T_{\bar{q}},Z_{\bar{q}})$ are also bijective. Therefore, for every solution of equation 5.4, there is an isomorphic solution which satisfies equation 5.5, where the mappings of the coordinates of one to the other are given in equations 5.7 to 5.9, and hence these two solutions are isomorphic to each other.

Since $T_q$ is quadratic residue, it may be expressed as:

$$T_q = Y^2 \qquad 5.10$$

Therefore, from equation 5.9, $T_{\bar{q}}$ may be expressed as:

$$T_{\bar{q}} = g^3 Y^2 \qquad 5.11$$

Using equations 5.10 and 5.11, equations 5.4 and 5.5 may be expressed as:

$$Y^2 = X_q^3 + aX_q Z_q^2 + bZ_q^3 \text{ and} \qquad 5.12$$

$$g^3 Y^2 = X_{\bar{q}}^3 + aX_{\bar{q}} Z_{\bar{q}}^2 + bZ_{\bar{q}}^3 \qquad 5.13$$

Since any solution of equation 5.4 has an isomorphic solution that satisfies equation 5.5, it follows that the any solution of equation 5.12, denoted as $(X_q,Y,Z_q)$, has an isomorphic solution that satisfies equation 5.13, denoted as $$\left(gX_q, g^{\frac{3}{2}}Y, gZ_q\right).$$

The solutions of equation 5.12, $(X_q,Y,Z_q)$, form the elliptic curve in projective coordinates. While, the solutions of equation 5.13, $$\left(gX_q, g^{\frac{3}{2}}Y, gZ_q\right),$$

form its twist in projective coordinates.

An example of a mapping of the solutions of $Y^2 = X^3 + aXZ^2 + bZ^3$ defined over F(p) where p≡3 mod 4 to the solutions of its twist is simply to use $-X$ for the X-coordinate, $-Z$ for the Z-coordinate, and hence $-Y^2$ for the Y-coordinate.

The isomorphism between a curve and its twist discussed above may be exploited to embed the bit sting of a shared secret key into the X and Z coordinate of an elliptic curve point without the need for: a) an iterative search for a quadratic residue value of the corresponding Y-coordinate that usually requires several iterations; and b) a different number of iterations for different bit strings that are being embedded.

Assume that the secret key is a M-bit string such that 2N>M>N−1 where N is the number of bits needed to represent the elements of F(p). The secret key bit string is divided into two bit-strings $k_X$ and $k_Z$. The value of the bit-strings $k_X$ and $k_Z$ must be less than p. One implementation of embedding the two bit-strings $k_X$ and $k_Z$ may be carried out as follows:

a) assign the value of the bit string of $k_Z$ to $Z_k$;
b) assign the value of the bit string of $k_X$ to $X_k$;
c) compute $T = X_k^3 + aX_k Z_k^2 + bZ_k^3$;
d) use the Legendre test to see if T has a square root, and if T has a square root, assign one of the roots to $Y_k$, else assign one of the roots of $g^3 T$ to $Y_k$, and the X-coordinate, and the Z-coordinate of the elliptic curve point with the embedded shared secret key bit string are given by $gX_k$, and $gZ_k$, respectively.

When using this process, p is usually predetermined prior to encryption, so the value of g can be predetermined. Finally, any non-quadratic value in F(p) can be used for g. For efficiency g is chosen to be (−1) for p≡3 mod 4 and (2) for p≡1 mod 4.

Message Data Bit-String Embedding Using Deterministic and Non-iterative Embedding The same deterministic and non-iterative process described above may be used to embed a secret message bit string into an elliptic curve in a deterministic and non-iterative manner without the need for the conventional iterative algorithm that involves the usual search for a quadratic residue value of the Y-coordinate (that usually requires several iterations and a different number of iterations for different bit strings that are being embedded).

Assume that the message is a M-bit string such that 2N>M>N−1 where N is the number of bits needed to represent the elements of F(p). The message string is divided into two strings $m_X$ and $m_Z$. The value of strings $m_X$ and $m_Z$ must be less than p. One implementation to embed the two strings may be carried out as follows:

a) assign the value of the bit string of $m_Z$ to $Z_m$;
b) assign the value of the bit string of $m_X$ to $X_m$;
c) compute $T = X_m^3 + aX_m Z_m^2 + bZ_m^3$; and
d) use Legendre test to see if T has a square root, and if T has a square root, assign one of the roots to $Y_m$, else assign one of the roots of $g^3 T$ to $Y_m$, and the X-coordinate, and the Z-coordinate of the elliptic curve point with the embedded secret message bit strings are given by $gX_m$, and $gZ_m$, respectively.

When using this process p is usually predetermined prior to encryption, and so the value of g can be predetermined. In addition, the strings $m_X$ and $m_Z$ may be recovered directly from $X_m$ and $Z_m$, respectively, and an extra bit is needed to identify whether $(X_m,Y_m,Z_m)$ or $(gX_m,Y_m,gZ_m)$ is used at the sending device. Any non-quadratic value in F(p) can be used for g. For efficiency, g is chosen to be (−1) for p≡3 mod 4 and (2) for p≡1 mod 4. At the receiver, the process is reversed. In the case of g=2, a division by 2 is carried out. It should be noted that dividing $X_m$ by two is computed using one modulo addition, because:

$$X_m/2 = ((X_m - (X_m) \bmod 2)/2) + (X_m) \bmod 2 * (\tfrac{1}{2}) \bmod p; \qquad \text{(i)}$$

$$(X_m) \bmod 2 \text{ is the least significant bit of } X_m; \text{ and} \qquad \text{(ii)}$$

$$(\tfrac{1}{2}) \bmod p = (p+1)/2. \qquad \text{(iii)}$$

Blinding the Base Point in Symmetric EC³ Cryptography with Shared Secret Key Embedding:

In conventional EC³ Cryptography, the cipher point is computed using:

$$(X_c,Y_c,Z_c) = (X_m,Y_m,Z_m) + (X_{bk},Y_{bk},Z_{bk})$$

where $(X_m,Y_m,Z_m)$ is the message point and $(X_{bk},Y_{bk},Z_{bk})$ is termed the encrypting point which is usually computed as the scalar multiplication of the shared secret key, k, and a base point, $(X_B,Y_B,Z_B)$, which is known publicly as:

$$(X_{bk},Y_{bk},Z_{bk}) = k(X_B,Y_B,Z_B)$$

and where the X, Y, and Z coordinates are elements of the underlying field, F(p), that are presented in N-bits.

Several processes are presented based on the principle of blinding the base point by making the base point dependant on the shared secret key. One benefit of blinding the base point with regard to increasing security is discussed below.

In one approach of this invention, the shared secret key is represented using nN-bits, where n is greater than or equal to one. The nN bits of the shared secret key may be given as one block, or generated using a smaller bit-string and a random number generator.

When n=3, several embodiments can be used to generate the encrypting point, $(X_{bk}, Y_{bk}, Z_{bk})$ as described below:

(i) One Blinded Base Point:

2N-bits of the shared secret key bit-string, termed $k_1$, are embedded into the X-coordinate and the Z-coordinate of an elliptic curve point using the method described in section 5.1 to obtain a blinded base point, $(X_{k_1}, Y_{k_1}, Z_{k_1})$. The other N-bits of the key are used as a scalar value, termed $k_2$, that is multiplied by the blinded base point to obtain the encrypting point: $(X_{bk}, Y_{bk}, Z_{bk}) = k_2(X_{k_1}, Y_{k_1}, Z_{k_1})$ (ii) One Blinded Base Point and One Public Base Point:

2N-bits of the shared secret key bit-string, termed $k_2$, are embedded into the X-coordinate and the Z-coordinate of an elliptic curve point using the method described in section 5.1 to obtain a blinded base point, $(X_{k_1}, Y_{k_1}, Z_{k_1})$ The other N-bits of the key are used as a scalar value, termed $k_2$, that is multiplied by the public base point, $(X_B, Y_B, Z_B)$, and the encrypting point is obtained as follows:

$$(X_{bk}, Y_{bk}, Z_{bk}) = (X_{k_1}, Y_{k_1}, Z_{k_1}) + k_2(X_B, Y_B, Z_B)$$

(iii) Two Blinded Base Point:

In another example, two blinded points are generated from the 3N-bits of the shared secret key bit-string. One blinded point, $(X_{k_1}, Y_{k_1}, Z_{k_1})$, is generated by 2N-bits out of the 3N-bits of the shared secret key bit-string, while the other blinded base point, $(X_{k_2}, Y_{k_2}, Z_{k_2})$, is obtained by a different 2N-bits combination of the 3N-bits of the shared secret key bit-string. Part of the key used to generate the point $(X_{k_1}, Y_{k_1}, Z_{k_1})$, say $k_1$, is used as a scalar and multiplied by the point $(X_{k_2}, Y_{k_2}, Z_{k_2})$ to obtain the scalar multiplication $k_1(X_{k_2}, Y_{k_2}, Z_{k_2})$. The other part of the key used to generate the point $(X_{k_2}, Y_{k_2}, Z_{k_2})$, say $k_2$, is used as a scalar and multiplied by the point $(X_{k_1}, Y_{k_1}, Z_{k_1})$ to obtain the scalar multiplication $k_2(X_{k_1}, Y_{k_1}, Z_{k_1})$. The encrypting point may be selected using any one of the following:

$$(X_{bk}, Y_{bk}, Z_{bk}) = k_2(X_{k_1}, Y_{k_1}, Z_{k_1}) + k_1(X_{k_2}, Y_{k_2}, Z_{k_2}) \quad \text{i.}$$

$$(X_{bk}, Y_{bk}, Z_{bk}) = (X_{k_1}, Y_{k_1}, Z_{k_1}) + k_1(X_{k_2}, Y_{k_2}, Z_{k_2}) \quad \text{ii.}$$

$$(X_{bk}, Y_{bk}, Z_{bk}) = k_2(X_{k_1}, Y_{k_1}, Z_{k_1}) + (X_{k_2}, Y_{k_2}, Z_{k_2}) \quad \text{iii.}$$

Figure 2:
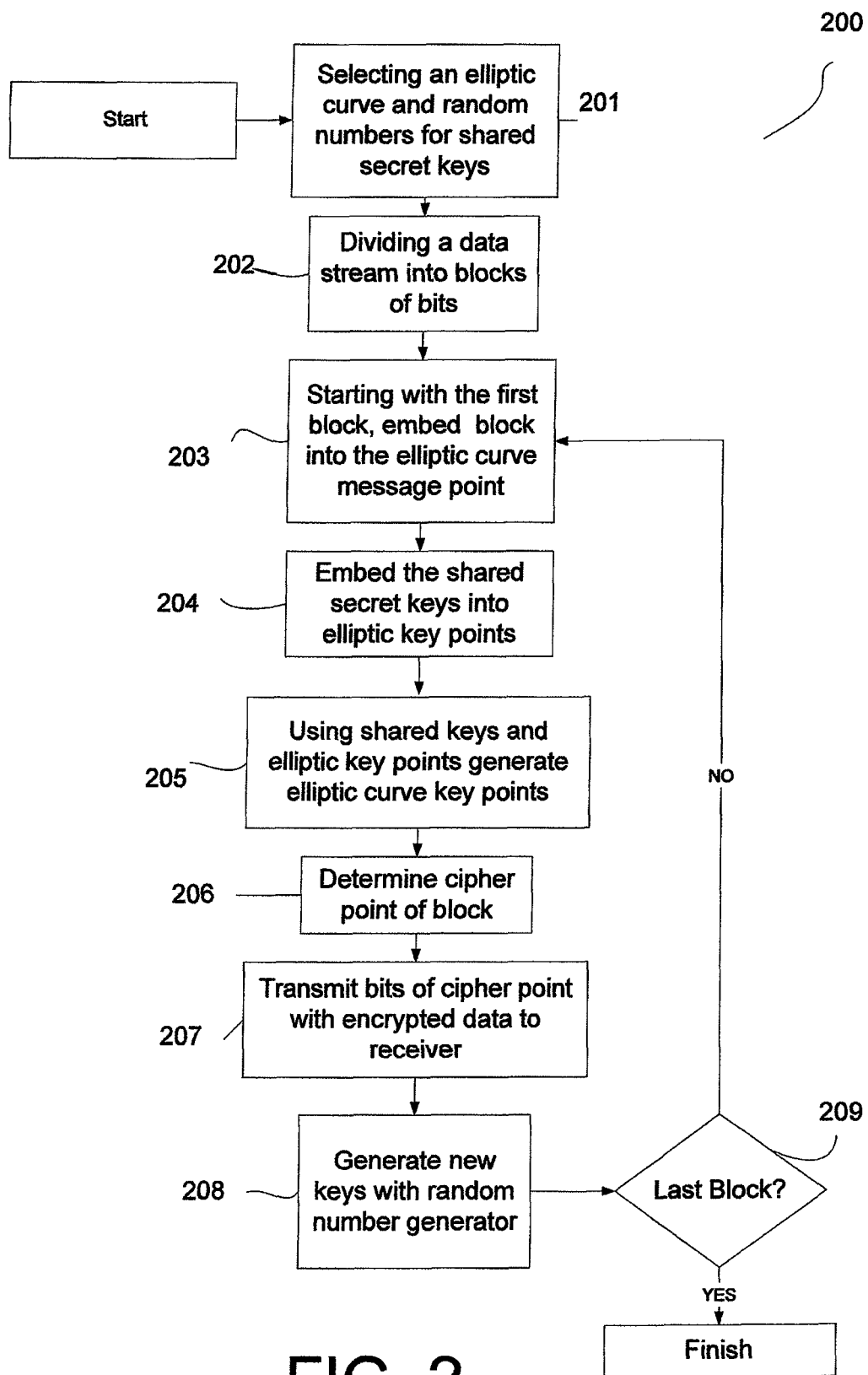
FIG. 2 shows an encryption process for use in the system of FIG. 1.
Figure 3:
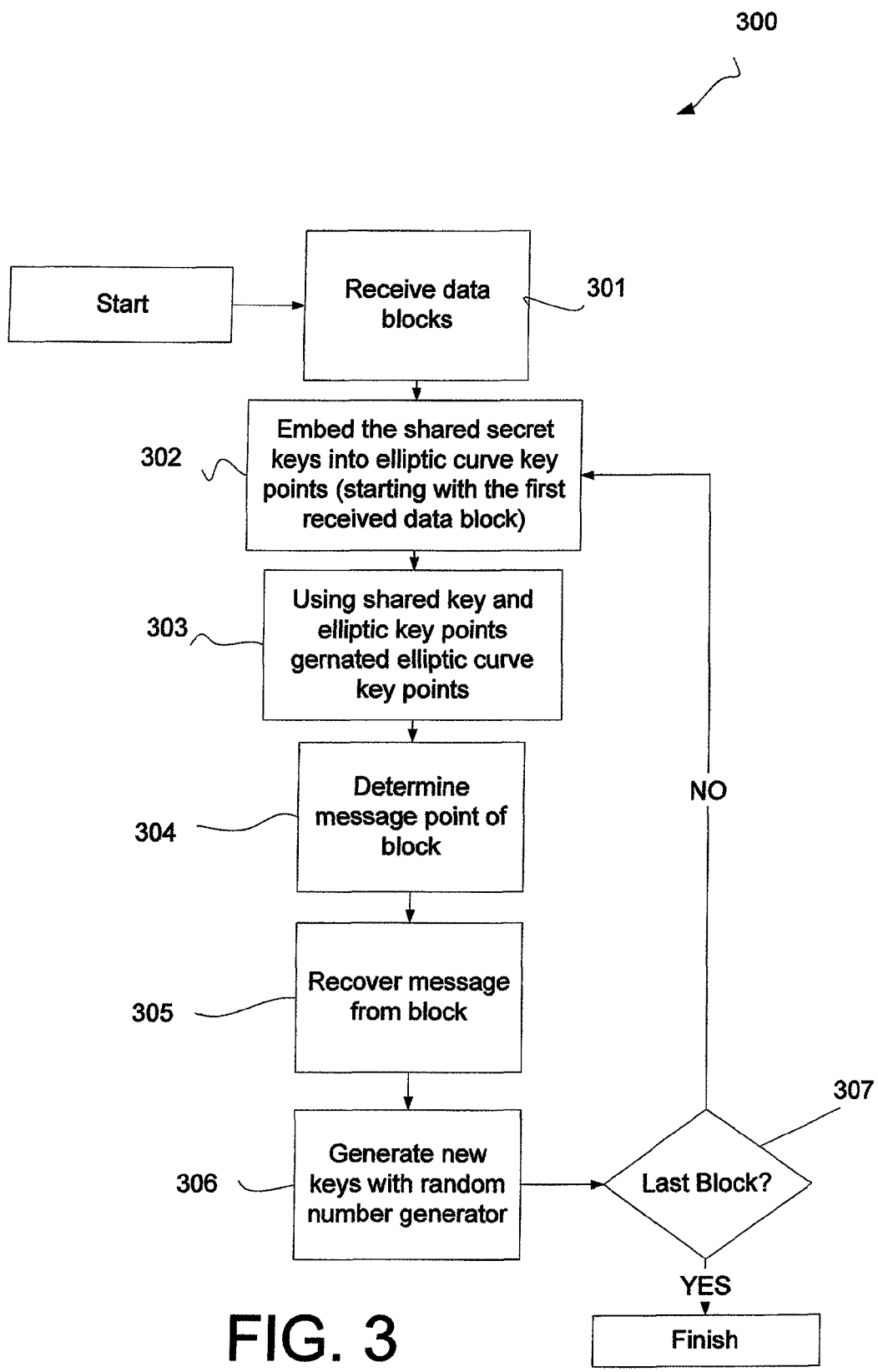
FIG. 3 shows a decryption process for use in the system of FIG. 1.

Symmetric $EC^3$ Cryptography with Shared Secret Key Embedding:

FIGS. 2 and 3 show a secret key $EC^3$ encryption and decryption process 200 and 300 that is based on the blinding of the base point described above in blinding the base point in symmetric $EC^3$ cryptography with shared secret key embedding. Assume that a data bit stream is encrypted in blocks of M-bits where $2N>M>N-1$ where N is the number of bits needed to represent the elements of F(p). Each block is encrypted using a Symmetric $EC^3$ Cryptography based on a shared secret key embedded as described below:

201) both the sending and receiving device agree on a set $EC^3$ by selecting an elliptic curve. They also need to agree on random number(s), $k_{r,0,i}, k_{s,0,i}, k_{x,0,i}, k_{z,0,i}$ for $i=1, \ldots, N_P$, that will be the shared secret keys for communication, where $N_P \geq 1$;

(The sending device performs 202-209)

202) divide data stream into blocks of bits;

203) starting with the first block (designated with index j=0), embed the jth block of the secret message bit string into an elliptic curve message point, $(X_{m,j}, Y_{m,j}, Z_{m,j})$ (e.g., using the process of embedding the message bits as described above in message data bit-string embedding using deterministic and non-iterative embedding method);

204) embed the shared secret key(s) bit strings $k_{x,j,i}$ & $k_{y,j,i}$ for $i=1, \ldots, N_P$ into the elliptic key points, $(XK_{x,j,i}, YK_{j,i}, ZK_{z,j,i})$ for $i=1, \ldots, N_P$ (e.g., using a process of embedding the secret key(s) bit-stings as described above in shared secret key embedding using deterministic and non-iterative embedding method);

205) using the shared keys $k_{r,j,i}$ & $k_{s,j,i}$ for $i=1, \ldots, N_P$, and the elliptic key points $(XK_{x,j,i}, YK_{j,i}, ZK_{z,j,i})$ for $i=1, \ldots, N_P$, generate the elliptic curve key point(s), $(XR_{x,j,i}, YR_{j,i}, ZR_{z,j,i})$ for $i=1, \ldots, N_P$, $(XR_{x,j,i}, YR_{j,i}, ZR_{z,j,i}) = k_{r,j,i}(XR_{x,j-1,i}, YR_{j-1,i}, ZR_{z,j-1,i}) + k_{s,j,i}(XK_{x,j,i}, YK_{j,i}, ZK_{z,j,i})$ 206) the cipher point of the jth data block, $(X_{c,j}, Y_{c,j}, Z_{c,j})$ is computed using, $$(X_{c,j}, Y_{c,j}, Z_{c,j}) = (X_{m,j}, Y_{m,j}, Z_{m,j}) + \sum_{i=1}^{N_P}(XR_{x,j,i}, YR_{j,i}, ZR_{z,j,i})$$

207) the appropriate bits of the X-coordinate, $X_{c,j}$, and the Z-coordinate, $Z_{c,j}$, of the cipher point $(X_{c,j}, Y_{c,j}, Z_{c,j})$ are sent to the receiving device together with any other information needed to recover the message point without sacrificing security;

208) generate the new key(s), $k_{r,j+1,i}, k_{s,j+1,i}, k_{x,j+1,i}, k_{z,j+1,i}$ for $i=1, \ldots, N_P$ needed for the encryption of the next block of the message data bit string using one or more random number generators and the key(s) $k_{r,j,i}, k_{s,j,i}, k_{x,j,i}, k_{z,j,i}$ for $i=1, \ldots, N_P$;

209) go to step 203 to encrypt the next block of the data stream;

The process 300 at the receiving device is shown in FIG. 3 and is described as follows:

301) receive data blocks;

302) embed the shared secret key(s) bit strings $k_{x,j,i}$ & $k_{z,j,i}$ for $i=1, \ldots, N_P$ into the elliptic curve key points, $(XK_{x,j,i}, YK_{j,i}, ZK_{z,j,i})$ for $i=1, \ldots, N_P$. A possible method of embedding the secret key(s) bit-stings is described above in shared secret key embedding using deterministic and non-iterative embedding method;

303) using the shared keys $k_{r,j,i}$ & $k_{s,j,i}$ for $i=1, \ldots, N_P$, and the elliptic key points $(XK_{x,j,i}, YK_{j,i}, ZK_{z,j,i})$ for $i=1, \ldots, N_P$, generate the elliptic curve key point(s), $(XR_{x,j,i}, YR_{j,i}, ZR_{z,j,i})$ for $i=1, \ldots, N_P$, $(XR_{x,j,i}, YR_{j,i}, ZR_{z,j,i}) = k_{r,j,i}(XR_{x,j-1,i}, YR_{j-1,i}, ZR_{z,j-1,i}) + k_{s,j,i}(XK_{x,j,i}, YK_{j,i}, ZK_{z,j,i})$ 304) the message point of the jth block, $(X_{m,j}, Y_{m,j}, Z_{m,j})$, is computed using, $$(X_{m,j}, Y_{m,j}, Z_{m,j}) = (X_{c,j}, Y_{c,j}, Z_{c,j}) - \sum_{i=1}^{N_P}(XR_{x,j,i}, YR_{j,i}, ZR_{z,j,i})$$

and any information received from the sending device;

305) the secret messages bit string for the jth block is recovered from $X_{m,j}$ and $Z_{m,j}$, and any information received from the sending device;

306) generate the new key(s), $k_{r,j+1,i}, k_{s,j+1,i}, k_{x,j+1,i}, k_{z,j+1,i}$ for $i=1, \ldots, N_P$ needed for the decryption of the next block of the message data bit string using the same mechanism used in the sending device and the key(s) $k_{r,j,i}, k_{s,j,i}, k_{x,j,i}, k_{z,j,i}$ for $i=1, \ldots, N_P$; and 307) go to step 302 to decrypt the next block of the data stream.

Symmetric $EC^3$ Cryptography with Shared Secret Key Embedding and with no Scalar Multiplication:

A special case of the above symmetric $EC^3$ Cryptography with shared secret key embedding, described above in symmetric EC3 cryptography with shared secret key embedding, is when $k_{r,j,i} = k_{s,j,i} = 1$ for $i=1, \ldots, N_P$. In this case, no scalar multiplication is needed to calculate the points $(XR_{x,j,i}, YR_{j,i}, ZR_{z,j,i})$, for $i=1, \ldots, N_P$, which can be computed using one point addition, namely, $$(XR_{x,j,i}, YR_{j,i}, ZR_{z,j,i}) = (XR_{x,j-1,i}, YR_{j-1,i}, ZR_{z,j-1,i}) + (XK_{x,j,i}, YK_{j,i}, ZK_{z,j,i})$$

Non-Linear Symmetric $EC^3$ Cryptography

An extension of the symmetric $EC^3$ cryptography with shared secret embedding is described in this section which includes a non-linear process to generate the points $(XR_{x,j,i}, YR_{j,i}, ZR_{z,j,i})$, for $i=1, \ldots, N_P$ when the keys $k_{r,0,i} = k_{s,0,i} = 1$ for $i=1, \ldots, N_P$, and using the points $(XR_{x,j-1,i}, YR_{j-1,i}, ZR_{z,j-1,i})$ and $(XK_{x,j,i}, YK_{j,i}, ZK_{z,j,i})$ for $i=1, \ldots, N_P$. As an example, the points $(XR_{x,j,i}, YR_{j,i}, ZR_{z,j,i})$, for $i=1, \ldots, N_P$, are computed using, $$(XR_{x,j,i}, YR_{j,i}, ZR_{z,j,i}) = k_{r,j,i}(XR'_{x,j-1,i}, YR'_{j-1,i}, ZR'_{z,j-1,i}) + k_{s,j,i}(XK_{x,j,i}, YK_{j,i}, ZK_{z,j,i})$$

where, $$XR''_{z,j,i} = f_X(XR_{x,j-1,l}, ZR_{z,j-1,l} \mid l = 1, \ldots, N_P)$$

$$ZR''_{z,j,i} = f_Z(XR_{x,j-1,l}, ZR_{z,j-1,l} \mid l = 1, \ldots, N_P)$$

$$(XR'_{x,j,i}, YR'_{j,i}, ZR'_{z,j,i}) = \begin{cases} (XR''_{x,j,i}, YR''_{j,i}, ZR''_{z,j,i}) & \text{if it satisfies equation 5.1} \\ \left(gXR''_{x,j,i}, g^{\frac{3}{2}}YR''_{j,i}, gZR''_{z,j,i}\right) & \text{otherwise} \end{cases}$$

and $f_x(.)$ and $f_z(.)$ are any non-linear functions.

It should be clear that both the transmitting device and the receiving device perform the same non-linear function in generating the points $(XR_{x,j,i}, YR_{j,i}, ZR_{z,j,i})$ for $i=1, \ldots, N_P$.

Multi-Stage Hybrid Stream Cipher:

$EC^3$ symmetric cryptography with shared secret key embedding can be used in combination with other stream ciphers such as the Advanced Encryption Standard (AES) algorithm. In one implementation, the AES algorithm can be applied on a stream of data in blocks of, for example, 128-bits, 192-bits or 256-bits. The cipher bit string at the output of the AES algorithm may be applied as the input to the $EC^3$ symmetric encryption with shared secret key embedding as described in sections above. Since $EC^3$ symmetric encryption may operate at a different block length than that used in the preceding AES algorithm, a buffer is inserted between the two ciphers in order to offset for the difference between the message data block sizes used by the two ciphers.

The process is applied in a reverse order at the receiving device. $EC^3$ symmetric decryption with shared secret key embedding is first applied to the received blocks. A buffer is used to compensate for the buffer used at the sending device. AES decryption is then applied to the output of the buffer to obtain the original message bit string.

Security of $EC^3$:

The effect of using shared secret key embedding into the X-coordinate and the Z-coordinate of an elliptic curve point when represented in projective coordinate in encrypting a message data bit-string on the strength of elliptic curve cryptography is assessed for the effect on the solution of ECDLP and power analysis attacks.

ECDLP in $EC^3$:

The apparent intractability of the following elliptic curve discrete logarithm problem (ECDLP) is the basis of the security of elliptic curve cryptosystems. The ECDLP problem can be stated as follows: given an elliptic curve defined over F(p) that need N-bit for the representation of its elements, an elliptic curve point $(x_P, y_P) \in EC^2$ defined in affine coordinates, and a point $(x_Q, y_Q) \in EC^2$ defined in affine coordinates, determine the integer k, $0 \leq k \leq p-1$, such that $(x_Q, y_Q) = k(x_P, y_P)$ provided that such an integer exist. In what follows, it is assumed that such an integer exists.

The ECDLP in $EC^3$ can be stated as follows: given a point $(X_P, Y_P, Z_P) \in EC^3$ and a point $(X_Q, Y_Q, Z_Q) \in EC^3$ defined in projective coordinates, determine the integer k, $0 \leq k \leq \#EC^3$, such that $(X_Q, Y_Q, Z_Q) = k(X_P, Y_P, Z_P)$ where # denotes the order of the p-group.

The most well known method to solve the ECDLP is that of Pollard ρ-method, (e.g., J. Pollard, Monte Carlo methods for index computation mod p, Mathematic and Computation, Vol. 32 (1978) pp. 918-924) which has a complexity of $O(\sqrt{\pi p}/2)$, where a step is measured in terms of an elliptic curve point addition (e.g., N. Kobltiz, A. Menezes, S. Vanstone, The state of Elliptic Curve Cryptography, Designs, Codes, and Cryptography, Vol 19, 2000, pp 173-193).

In $EC^3$, the modified Pollard ρ-method can be formulated as follows: find two points $(X_i, Y_i, Z_i) = A_i(X_Q, Y_Q, Z_Q) + B_i k(X_P, Y_P, Z_P)$ and $(X_j, Y_j, Z_j) = A_j(X_Q, Y_Q, Z_Q) + B_j k(X_P, Y_P, Z_P)$ such that $(X_i, Y_i, Z_i) = (X_j, Y_j, Z_j)$, and hence $$k = \frac{A_i + A_j}{B_i + B_j},$$

and given that all the points are members of $EC^3$.

It is clear that the complexity of the Pollard ρ-method in $EC^3$, when the point $(X_P, Y_P, Z_P)$ is known, is $O(\sqrt{\pi(\#EC^3)}/2)$ where $\#EC^3$ is proportional to $(\#F(p))^2$ and where # denotes the order of a field or group. Hence, the complexity of the Pollard ρ-method in $EC^3$ is no less than the complexity of the Pollard ρ-method in $EC^2$ for the same group order.

Furthermore, the problem is even more difficult with shared secret key embedding since the point $(X_P, Y_P, Z_P)$ is blinded because of its dependence on a shared secret key. The attacker only has $k(X_P, Y_P, Z_P)$ from which to find k and $(X_P, Y_P, Z_P)$. Clearly this is an undetermined problem.

Security Against SPA and DPA:

Simple and differential power analysis can be used to attack $EC^3$ cryptosystems in a similar manner in which they are used to attack EC cryptosystems.

The countermeasures that are used against simple and differential power analysis for $EC^2$ cryptosystems are also applicable for $EC^3$. For example, the countermeasures proposed by J-S Coron, in "Resistance Against Differential Power Analysis for Elliptic Curve Cryptosystems, Cryptographic Hardware and Embedded Systems, Vol. 1717, Lecture Notes in Computer Science, pp 292-302, Springer-Verlag, 1999" may be used as countermeasures against power analysis in $EC^3$ cryptosystems. As an example, the randomized projective coordinates method can be applied in $EC^3$ by randomizing the coordinates of the second projection, that is $(X',Y',Z',V)=(X'\lambda,Y'\lambda,Z'\lambda,V\lambda)$, where $\lambda$ is a random variable.

Furthermore, as described above in attacks, one countermeasure against Differential Power Analysis is randomization of the base point. Since, the base point in symmetric $EC^3$ Cryptography with shared secret key embedding is effectively changing at random for every new data block, clearly $EC^3$ Cryptography with shared secret key embedding has an inherent countermeasure against Differential Power Analysis.

As an example, consider the case of $N_P=1$ and $k_{r,j,i}=0$ in symmetric $EC^3$ cryptography discussed above in symmetric EC3 cryptography with shared secret key embedding. The point $(XR_{x,j,1}, YR_{j,1}, ZR_{z,j,1})$ is computed using, $$(XR_{x,j,1}, YR_{j,1}, ZR_{z,j,1}) = k_{s,j,1}(XK_{x,j,1}, YK_{j,1}, ZK_{z,j,1})$$

and the cipher point is computed using, $$(X_{c,j}, Y_{c,j}, Z_{c,j}) = (X_{m,j}, Y_{m,j}, Z_{m,j}) + (XR_{x,j,1}, YR_{j,1}, ZR_{z,j,1})$$

As discussed above in symmetric EC3 cryptography with shared secret key embedding, the point $(XK_{x,j,1}, YK_{j,1}, ZK_{z,j,1})$ is generated by embedding a randomly generated key into the X-coordinate and the Z-coordinate.

As a consequence, the randomly generated point $(XK_{x,j,1}, YK_{j,1}, ZK_{z,j,1})$ is equivalent to blinding a base point through randomization. Therefore, the new disclosed symmetric $EC^3$ cryptography with shared secret key embedding inherently provides a countermeasure against differential power analysis.

The Legendre Symbol is used to test whether an element of $F(p)$ has a square root or not, i.e., whether an element is quadratic residue or not. This implies that one does not need to compute the square root to check if an element has a square root or not. The Legendre Symbol and test is described below:
Legendre Symbol Given an element of a finite field $F(p)$, say d, the Legendre symbol is defined as $$\left(\frac{d}{p}\right).$$

To test whether d is quadratic residue or not, the Legendre symbol, $$\left(\frac{d}{p}\right),$$

is used:

$$\left(\frac{d}{p}\right) = \begin{cases} +1 & \text{if } x \text{ is quadratic residue} \\ 0 & \text{if } x \equiv 0 \bmod F(p) \\ -1 & \text{otherwise} \end{cases}$$

A number of exemplary implementations have been described. Nevertheless, it will be understood that various modifications may be made. For example, suitable results may be achieved if the steps of described techniques are performed in a different order and/or if components in a described system, architecture, device, or circuit are combined in a different manner and/or replaced or supplemented by other components. Accordingly, other implementations are within the scope of the following claims.

What is claimed is:

1. A method for communicating securely over an insecure communications channel between two communications devices that perform respective ones of a pair of complementary cryptographic operations, said method comprising:
providing a communication system including a computer transmitting device, and a computer receiving device connected together using a communication channel to provide network online services, contents and resources to said computer receiving device and the user of said computer receiving device;
assembling a data string including information to be transmitted from a transmitting device to a receiving device;
encrypting the data string using a deterministic and non-iterative process for embedding bit strings into points on a projected elliptic curve defined over a finite field and represented in projective coordinates;
transmitting the encrypted data over the communication channel to the receiving device; and
decrypting the data using a complementary of the encrypting process, wherein
the projective coordinates ensure that the projected elliptic curve and its twist are isomorphic to each other.

2. The method of claim 1 wherein encrypting further comprises embedding a shared secret key into the X-coordinate and the Z-coordinate of an elliptic curve point defined in projective coordinates.

3. The method of claim 1 wherein encrypting further comprises embedding a shared secret key partly or wholly into the X-coordinate and/or the Z-coordinate of an elliptic curve point represented in projective coordinates.

4. The method of claim 1 wherein the encrypting process includes applying the projective coordinates in two stages, including a first stages where a projective coordinate is used to embed extra message data bits in the Z coordinate, and a second stage a projective coordinate is used to randomize the computation in order to provide a counter measure against differential power analysis thereby removing the need to perform a field division operation at every iteration of an elliptic curve scalar multiplication.

5. The method of claim 1 wherein the isomorphic relationship between a projected elliptic curve and its twist is obtained as a result of the selected projective coordinate to ensure that any bit string whose equivalent binary value is an element of the underlying finite field has a bijective relationship between the bit string and a point on the projected elliptic curve or its twist.

6. The method of claim 1 wherein the data string is a M-bit string such that $2N>M>N-1$ where N is the number of bits needed to represent the elements of finite field $F(p)$, the method further comprising:
dividing the data string into two bit strings $m_x$ and $m_z$ where the value of strings $m_x$ and $m_z$ is less than p;
assigning the value of the bit string of $m_z$ to $Z_m$;
assigning the value of the bit string of $m_x$ to $X_m$;
determining $T = X_m^3 + aX_m Z_m^2 + bZ_m^3$; and
using the Legendre test to see if T has a square root, and if T has a square root, assign one of the roots to $Y_m$, else assign one of the roots of $g^3 T$ to $Y_m$ and the X-coordinate, and the Z-coordinate of the elliptic curve point with the embedded shared secret key bit strings are given by $gX_m$, and $gZ_m$, respectively, where X, Z, T, a & b∈F(p) and any value of X and Z will result in a value of T∈F(p) and any non-quadratic value in F(p) can be used for g.

7. A method for elliptic cryptograph in a communications system, the method comprising:
providing a communication system including a computer transmitting device, and a computer receiving device connected together using a communication channel to provide network online services, contents and resources to said computer receiving device and the user of said computer receiving device;
establishing an elliptic curve message point $(X_m, Y_m, Z_m)$ by embedding a message bit string into the x-coordinate, $X_m$, and the z-coordinate, $Z_m$, of the elliptic curve message point;
embedding a shared secret key (k) into the X-coordinate and the Z-coordinate of another elliptic curve point $(X_k, Y_k, Z_k)$;
determining a cipher point $(X_c, Y_c, Z_c)$ using, $(X_c, Y_c, Z_c)=(X_m, Y_m, Z_m)+(X_k, Y_k, Z_k)$,
transmitting selected bits of the X-coordinate, $X_c$ and the Z-coordinate $Z_c$ of the cipher point $(X_e, Y_e, Z_e)$;
receiving the selected bits;
determining the elliptic curve point $(X_k, Y_k, Z_k)$ using the shared secret key (k);
determining the message point $(X_m, Y_m, Z_m)$ using $(X_m, Y_m, Z_m)=(X_c, Y_c, Z_c)-(X_k, Y_k, Z_k)$; and
recovering the message bit string from $X_m$ and $Z_m$, wherein the embedding of a bit string into elliptic curve points defined over a finite field represented in projective coordinates is carried out using a deterministic and non-iterative process.

8. The method of claim 7 wherein embedding the shared secret includes embedding part of the initial shared secret, $k_0$, in the X-coordinate and the Z-coordinate of an elliptic curve point $(X_{k0}, Y_{k0}, Z_{k0})$.

9. The method of claim 8 wherein embedding the shared secret includes multiplying the point $(X_{k0}, Y_{k0}, Z_{k0})$ with another part of the shared secret key, $k_1$, to obtain the scalar multiplication $k_1(X_{k0}, Y_{k0}, Z_{k0})$.

10. The method of claim 7 further comprises dividing the message bit stream into a series of message blocks and using the initial secret key in conjunction with a random number generator to generate a sequence of different secret keys to encrypt different message data blocks.

11. The method of 10 wherein the secret key for the jth message data block, k(j), is embedded into an elliptic curve point to find the point, $(X_{k(j)}, Y_{k(j)}, Z_{k(j)})$.

12. The method of claim 7 further comprising dividing a message bit stream into blocks, and generating an elliptic curve message point $(X_{m(j)}, Y_{m(j)}, Z_{m(j)})$ for the jth block by embedding the bit string of the jth message data block into the elliptic curve message point.

13. The method of claim 12 further comprising determining the cipher point of the jth message data block using, $(X_{c(j)}, Y_{c(j)}, Z_{c(j)})=(X_{m(j)}, Y_{m(j)}, Z_{m(j)})+(X_{k(j)}, Y_{k(j)}, Z_{k(j)})+s(j)k_1(X_{k0}, Y_{k0}, Z_{k0})$, wherein s(j)=1 when j=0 and is zero otherwise.

14. The method of claim 13 further comprising transmitting appropriate bits of the X-coordinate, $X_c$, and the Z-coordinate, $Z_c$, of the cipher point, $(X_c, Y_c, Z_c)$, to a receiving device.

15. The method of wherein 14 determining the message point, $(X_m, Y_m, Z_m)$ includes determining $(X_{m(j)}, Y_{m(j)}, Z_{m(j)})= (X_{c(j)}, Y_{c(j)}, Z_{c(j)})-(X_{k(j)}, Y_{k(j)}, Z_{k(j)})-S(j)k_1(X_{k0}, Y_{k0}, Z_{k0})$; and recovering the bit string of the jth message block from $X_{m(j)}$ and $Z_{m(j)}$.

16. The method of claim 7 wherein a base point $(X_{k0}, Y_{k0}, Z_{k0})$ is blinded by making it dependant on the secret key.

17. The method of claim 16 wherein blinding the base point eliminates the need for scalar multiplication to encrypt the stream of data blocks.

18. A method for encrypting in a communications system using $EC^3$ Cryptography, the method comprising:
providing a communication system including a computer transmitting device, and a computer receiving device connected together using a communication channel to provide network online services, contents and resources to said computer receiving device and the user of said computer receiving device;
determining a base point $(X_B, Y_B, Z_B)$;
blinding the base point by making the base point dependant on a shared secret key; and
computing a cipher point using $(X_c, Y_c, Z_c)=(X_m, Y_m, Z_m)+(X_{bk}, Y_{bk}, Z_{bk})$,
where $(X_m, Y_m, Z_m)$ is the message point and $(X_{bk}, Y_{bk}, Z_{bk})$ is the encrypting point determined as the scalar multiplication of a shared secret key, k, and the blinded base point, where the X, Y, and Z coordinates are elements of the underlying finite field, F(p), that are presented in N-bits, wherein the embedding of a bit string into elliptic curve points defined over a finite field represented in projective coordinates is carried out using a deterministic and non-iterative process.

19. The method of claim 18 further comprising embedding 2N-bits of the shared secret key bit-string, $k_1$, in the X-coordinate and the Z-coordinate of an elliptic curve point to obtain the blinded base point, $(X_{k_1}, Y_{k_1}, Z_{k_1})$; using the other N-bits of the shared secret key as a scalar value, $k_2$, that is multiplied by the blinded base point to obtain the encrypting point $(X_{bk}, Y_{bk}, Z_{bk})=K_2(X_{k_1}, Y_{k_1}, Z_{k_1})$.

20. The method of claim 18 further comprising embedding 2N-bits of the shared secret key bit-string, $k_2$, in the X-coordinate and the Z-coordinate of an elliptic curve point to obtain the blinded base point, $(X_{k_1}, Y_{k_1}, Z_{k_1})$; and using the other N-bits of the shared secret key as a scalar value, termed $k_2$, that is multiplied by the public base point, $(X_B, Y_B, Z_B)$ to determine the encrypting point $(X_{bk}, Y_{bk}, Z_{bk})=(X_{k_1}, Y_{k_1}, Z_{k_1})+(X_B, Y_B, Z_B)$.

21. The method of claim 18 further comprising generating two blinded based points from 3N-bits of the shared secret key bit-string, a first blinded point, $(X_{k_1}, Y_{k_1}, Z_{k_1})$, generated by 2N-bits out of the 3N-bits of the shared secret key bit-string, and a second blinded base point, $(X_{k_2}, Y_{k_2}, Z_{k_2})$, obtained by a different 2N-bits combination of the 3N-bits of the shared secret key bit-string.

22. The method of claim 21 wherein part of the key $K_1$ used to generate the point $(X_{k_1}, Y_{k_1}, Z_{k_1})$ is a scalar and multiplied by the point $(X_{k_2}, Y_{k_2}, Z_{k_2})$ to obtain the scalar multiplication $k_1(X_{k_2}, Y_{k_2}, Z_{k_2})$ and the other part of the key $k_2$ used to generate the point $(X_{k_2}, Y_{k_2}, Z_{k_2})$ is a scalar and multiplied by the point $(X_{k_1}, Y_{k_1}, Z_{k_1})$ to obtain the scalar multiplication $k_2(X_{k_1}, Y_{k_1}, Z_{k_1})$.

23. The method of claim 22 wherein the encrypting point may be selected using any one of:

$(X_{bk}, Y_{bk}, Z_{bk})=k_2(X_{k_1}, Y_{k_1}, Z_{k_1})+k_1(X_{k_2}, Y_{k_2}, Z_{k_2})$, $(X_{bk}, Y_{bk}, Z_{bk})=(X_{k_1}, Y_{k_1}, Z_{k_1})+k_1(X_{k_2}, Y_{k_2}, Z_{k_2})$, and $(X_{bk}, Y_{bk}, Z_{bk})=k_2(X_{k_1}, Y_{k_1}, Z_{k_1})+(X_{k_2}, Y_{k_2}, Z_{k_2})$.

24. A method for a communications system transmitting a data bit stream is encrypted in blocks of M-bits where 2N>M>N−1 where N is the number of bits needed to represent the elements of a finite set F(p) and each block is encrypted using symmetric $EC^3$ cryptography based on an embedded shared secret key, the method comprising:

providing a communication system including a computer transmitting device, and a computer receiving device connected together using a communication channel to provide network online services, contents and resources to said computer receiving device and the user of said computer receiving device;

selecting an elliptic curve and agree on random numbers, $k_{r,0,i}, k_{s,0,i}, k_{x,0,i}, k_{z,0,i}$ for $i=1,\ldots,N_P$, as the shared secret keys for communication, where $N_P \geq 1$;

beginning with a first block having designated index $j=0$, embedding the jth block of the secret message bit string into an elliptic curve message point, $(X_{m,j}, Y_{m,j}, Z_{m,j})$;

embedding the shared secret keys bit strings $k_{x,0,i}$ & $k_{z,0,i}$ for $i=1,\ldots,N_P$ into the elliptic key points, $(XK_{x,j,i}, YK_{j,i}, ZK_{z,j,i})$ for $i=1,\ldots,N_P$;

using the shared keys $k_{r,0,i}$ & $k_{s,0,i}$ for $i=1,\ldots,N_P$, and the elliptic key points $(XK_{x,j,i}, YK_{j,i}, ZK_{z,j,i})$ for $i=1,\ldots,N_P$, to generate the elliptic curve key point(s), $(XR_{x,j,i}, YR_{j,i}, ZR_{z,j,i})$ for $i=1,\ldots,N_P$, $$(XR_{x,j,i}, YR_{j,i}, ZR_{z,j,i}) = k_{r,j,i}(XR_{x,j-1,i}, YR_{j-1,i}, ZR_{z,j-1,i}) + k_{s,j,i}(XK_{x,j,i}, YK_{j,i}, ZK_{z,j,i})$$

determining the cipher point of the jth data block, $(X_{c,j}, Y_{c,j}, Z_{c,j})$, using $$(X_{c,j}, Y_{c,j}, Z_{c,j}) = (X_{m,j}, Y_{m,j}, Z_{m,j}) + \sum_{i=1}^{N_P} (XR_{x,j,i}, YR_{j,i}, ZR_{z,j,i}); \text{ and}$$

transmitting bits of the X-coordinate, $X_{c,j}$, and the Z-coordinate, $Z_{c,j}$, of the cipher point $(X_{c,j}, Y_{c,j}, Z_{c,j})$ to a receiving device, wherein the embedding of a bit string into elliptic curve points defined over a finite field represented in projective coordinates is carried out using a deterministic and non-iterative process.

25. The method of claim 24 further comprising:

generating new key, $k_{r,j+1,i}, k_{s,j+1,i}, k_{x,j+1,i}, k_{z,j+1,i}$ for $i=1,\ldots,N_P$ for encryption of the next block of the message data bit string using one or more random number generators and the keys $k_{r,j,i}, k_{s,j,i}, k_{x,j,i}, k_{z,j,i}$ for $i=1,\ldots,N_P$, and repeating the process for the next block of the data stream.

26. The method of claim 24 further comprising:

embedding the shared secret keys bit strings $k_{x,0,i}$ & $k_{z,0,i}$ for $i=1,\ldots,N_P$ into the elliptic curve key points, $(XK_{x,j,i}, YK_{j,i}, ZK_{z,j,i})$ for $i=1,\ldots,N_P$;

using the shared keys $k_{r,0,i}$ & $k_{s,0,i}$ for $i=1,\ldots,N_P$, and the elliptic key points $(XK_{x,j,i}, YK_{j,i}, ZK_{z,j,i})$ for $i=1,\ldots,N_P$, to generate the elliptic curve key points, $(XR_{x,j,i}, YR_{j,i}, ZR_{z,j,i})$ for $i=1,\ldots,N_P$, $$(XR_{x,j,i}, YR_{j,i}, ZR_{z,j,i}) = k_{r,j,i}(XR_{x,j-1,i}, YR_{j-1,i}, ZR_{z,j-1,i}) + k_{s,j,i}(XK_{x,j,i}, YK_{j,i}, ZK_{z,j,i});$$

determining the message point of the jth block, $(X_{m,j}, Y_{m,j}, Z_{m,j})$, using, $$(X_{m,j}, Y_{m,j}, Z_{m,j}) = (X_{c,j}, Y_{c,j}, Z_{c,j}) - \sum_{i=1}^{N_P} (XR_{x,j,i}, YR_{j,i}, ZR_{z,j,i}); \text{ and}$$

recovering the secret message bit string for the jth block from $X_{m,j}$ and $Z_{m,j}$, and any information received from the transmitting device.

27. The method of claim 26 further comprising generating the new key(s), $k_{r,j+1,i}, k_{s,j+1,i}, k_{x,j+1,i}, k_{z,j+1,i}$ for $i=1,\ldots,N_P$ needed for the decryption of the next block of the message data bit string using one or more random number generators and the key(s) $k_{r,j,i}, k_{s,j,i}, k_{x,j,i}, k_{z,j,i}$ for $i=1,\ldots,N_P$ using an identical process as that used in the transmitting device.

* * * * *